US012697715B2

(12) United States Patent
Vyas et al.

(10) Patent No.: US 12,697,715 B2
(45) Date of Patent: Aug. 4, 2026

(54) ARTICULATED JOINT SYSTEM

(71) Applicant: UNIVERSAL CITY STUDIOS LLC, Universal City, CA (US)

(72) Inventors: Anisha Vyas, Orlando, FL (US); Timothy J. Eck, Windermere, FL (US); Haz Minor, Wyoming, OH (US); Phil Said, South Lyon, MI (US); Le Phan, Winter Park, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 729 days.

(21) Appl. No.: 17/957,582

(22) Filed: Sep. 30, 2022

(65) Prior Publication Data

US 2024/0003380 A1     Jan. 4, 2024

Related U.S. Application Data

(60) Provisional application No. 63/357,560, filed on Jun. 30, 2022.

(51) Int. Cl.
| | |
|---|---|
| *F16C 11/06* | (2006.01) |
| *B25J 9/10* | (2006.01) |
| *B25J 15/00* | (2006.01) |

(52) U.S. Cl.
CPC ........... *B25J 9/106* (2013.01); *B25J 15/0009* (2013.01)

(58) Field of Classification Search
CPC ..... B25J 15/0009; B25J 17/0275; B25J 9/106
See application file for complete search history.

(56) References Cited

U.S. PATENT DOCUMENTS

| | | | | |
|---|---|---|---|---|
| 4,821,594 A | * | 4/1989 | Rosheim | .............. B25J 17/0266 |
| | | | | 901/28 |
| 5,383,738 A | * | 1/1995 | Herbermann | ........... F21V 21/29 |
| | | | | 403/56 |

(Continued)

FOREIGN PATENT DOCUMENTS

| | | |
|---|---|---|
| DE | 102013014239 A1 | 3/2014 |
| EP | 2239106 B1 | 3/2012 |

(Continued)

OTHER PUBLICATIONS

International Search Report and Written Opinion—PCT/US2023/069149—ISA/EPO—Oct. 24, 2023.
Takaki, et al, "High Performance Anthropomorphic Robot Hand with Grasp Force Magnification Mechanism", 2009 IEEE International Conference on Robotics and Automation, Kobe International (Continued)

*Primary Examiner* — Gregory Robert Weber
(74) *Attorney, Agent, or Firm* — Fletcher Yoder, PC

(57)     ABSTRACT

Aspects of the disclosure relate to an articulated joint. The articulated joint includes a first rotatable joint member including a first socket cavity, and a second rotatable joint member including a second socket cavity. The articulated joint further includes an elongated member including a first end having a spherical shape and a second end having the spherical shape, the first end of the elongated member being moveably secured in the first socket cavity and the second end of the elongated member being moveably secured in the second socket cavity. The elongated member is configured to rotate the second rotatable joint member in response to a rotation of the first rotatable joint member.

17 Claims, 40 Drawing Sheets

(56) References Cited

U.S. PATENT DOCUMENTS

| | | | | |
|---|---|---|---|---|
| 6,588,967 | B2 * | 7/2003 | Rivin .................. | F16C 11/0609 |
| | | | | 403/132 |
| 8,956,068 | B2 * | 2/2015 | Mekid .................. | F16M 11/043 |
| | | | | 248/176.1 |
| 9,168,657 | B2 * | 10/2015 | Uemura ................... | B25J 11/00 |
| 11,524,415 | B2 * | 12/2022 | Nighswander ......... | F16M 11/14 |
| 2002/0172546 | A1 | 11/2002 | Rivin | |
| 2011/0068595 | A1 | 3/2011 | Ihrke et al. | |
| 2013/0338796 | A1 | 12/2013 | Moyer et al. | |

FOREIGN PATENT DOCUMENTS

| | | | |
|---|---|---|---|
| EP | 2480173 | B1 | 11/2016 |
| EP | 3370926 | B1 | 10/2019 |

OTHER PUBLICATIONS

Conference Center, Kobe, Japan, May 12-17, 2009, pp. 1697-1703.

Belter, et al, "Mechanical Design and Performance Specifications of Anthropomorphic Prosthetic Hands: A Review", Journal of Rehabilitation Research & Development, vol. 50 No. 5, 2013, pp. 599-618.

amazon.com, "Diy Studio Stop Motion Armature Kits | Metal Puppet Figure for Character Design Creation | Not-Ready Studio Armature Kits Very Easy to Assemble for Stop Motion Animation or Just Fun | 200 mm Tall." [online] https://www.amazon.com/Armature-Character-Creation-Not-Ready-Animation/dp/B072SKBR92. Retrieved Feb. 6, 2023.

Kinetic Armatures, "Armatures." [online] https://kineticarmatures.com/armatures/. Retrieved Sep. 30, 2022.

* cited by examiner

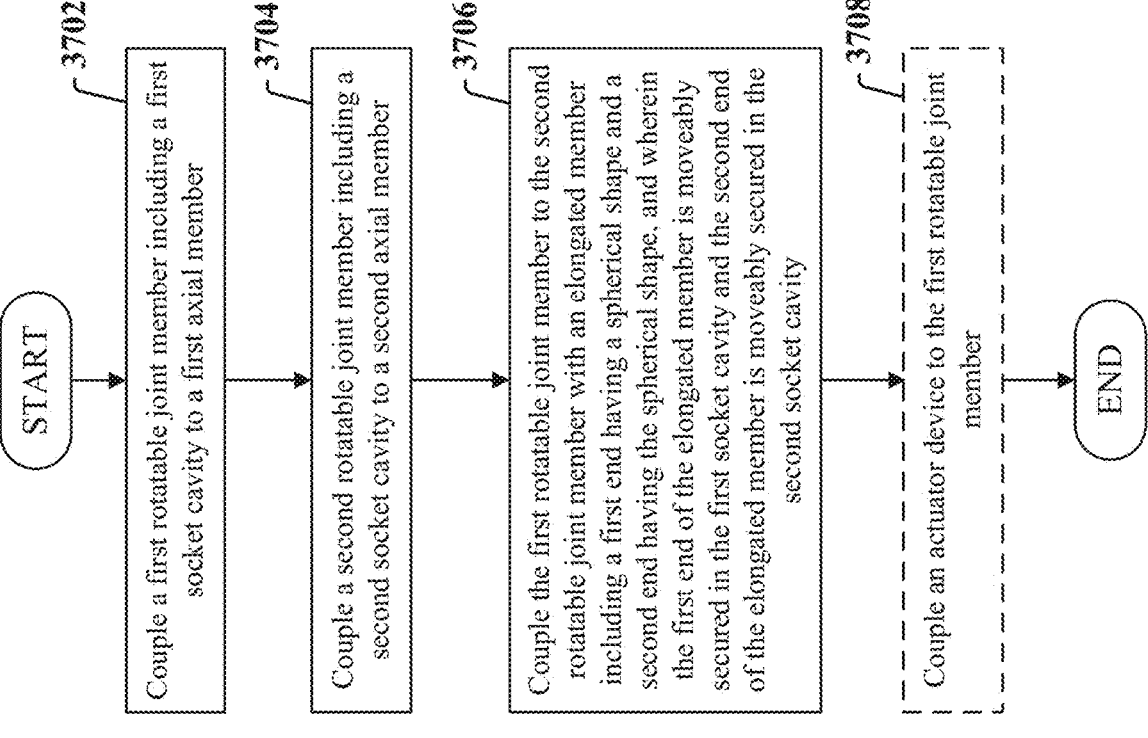

3700

3702
Couple a first rotatable joint member including a first socket cavity to a first axial member 3704
Couple a second rotatable joint member including a second socket cavity to a second axial member 3706
Couple the first rotatable joint member to the second rotatable joint member with an elongated member including a first end having a spherical shape and a second end having the spherical shape, and wherein the first end of the elongated member is moveably secured in the first socket cavity and the second end of the elongated member is moveably secured in the second socket cavity 3708
Couple an actuator device to the first rotatable joint member

FIG. 37

ARTICULATED JOINT SYSTEM

CROSS-REFERENCE TO RELATED APPLICATION

This application claims priority to and the benefit of U.S. Provisional Application Ser. No. 63/357,560 entitled "ARTICULATED JOINT SYSTEM" filed on Jun. 30, 2022, the entire contents of which is incorporated herein by reference as if fully set forth below in its entirety and for all applicable purposes.

TECHNICAL FIELD

The technology discussed below relates generally to an articulated apparatus, and more specifically to an articulated joint system.

INTRODUCTION

Electro-mechanically animated figures and show elements may be used in theme park attractions (e.g., rides or shows), restaurants, or other venues to enhance a user experience. These animated figures and show elements, for example, may include three-dimensional models of humans, animals, or other types of creatures (e.g., fictional creatures).

Some designs for animated figures may include at least one articulated hand. However, existing designs for articulated hands typically yield articulated hands having an unrealistic appearance and/or a limited range of motion. For example, existing articulated hands may have an unnaturally large size and/or improper proportion relative to the overall size of an animated figure due to bulky structural components that form the articulated hands and/or components (e.g., actuators) used for controlling movement of the articulated hands.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are related to articulated joints. In some aspects of the disclosure, an articulated joint includes a first rotatable joint member including a first socket cavity, and a second rotatable joint member including a second socket cavity. The articulated joint further includes an elongated member including a first end having a spherical shape and a second end having the spherical shape, the first end of the elongated member being moveably secured in the first socket cavity and the second end of the elongated member being moveably secured in the second socket cavity. The elongated member is configured to rotate the second rotatable joint member in response to a rotation of the first rotatable joint member.

In some aspects of the disclosure, an articulated joint is disclosed. The articulated joint includes a rotatable joint member including a socket cavity, where the rotatable joint member is configured to rotate about an axis. The elongated member further includes at least one end having a spherical shape, wherein the at least one end is moveably secured in the socket cavity of the rotatable joint member. The elongated member is configured to rotate the rotatable joint member about the axis.

In some aspects of the disclosure, a method for constructing an articulated joint is disclosed. The method includes coupling a first rotatable joint member including a first socket cavity to a first axial member, coupling a second rotatable joint member including a second socket cavity to a second axial member, and coupling the first rotatable joint member to the second rotatable joint member with an elongated member including a first end having a spherical shape and a second end having the spherical shape. The first end of the elongated member is moveably secured in the first socket cavity and the second end of the elongated member is moveably secured in the second socket cavity. In some aspects of the disclosure, the method optionally includes coupling an actuator device to the first rotatable joint member.

BRIEF DESCRIPTION OF THE DRAWINGS

FIG. 37 is a flow chart illustrating an exemplary process for constructing an articulated joint in accordance with various aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

Figure 1:
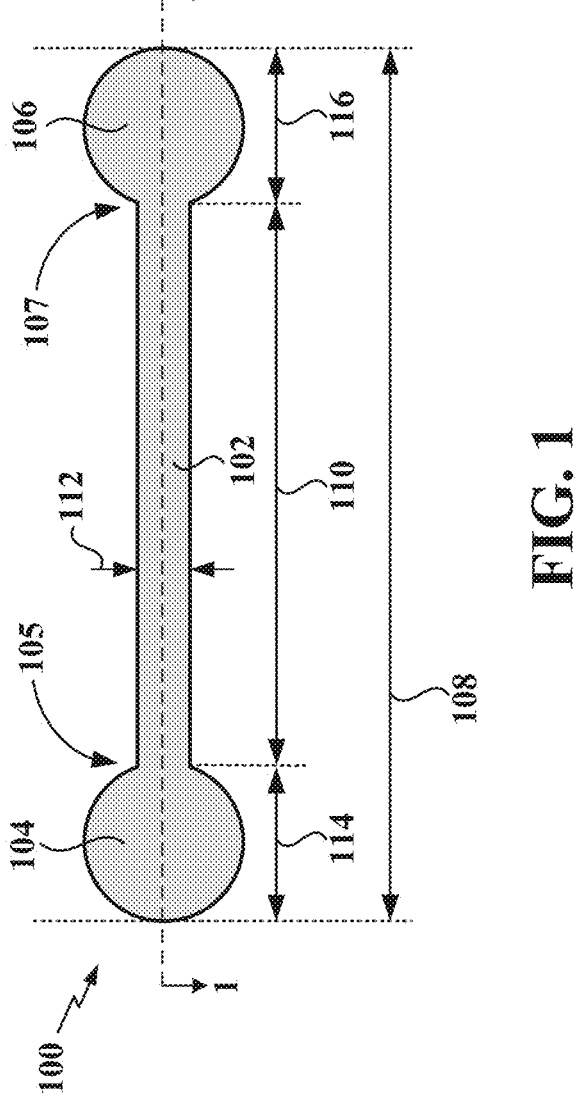
FIG. 1 is a diagram illustrating a side view of a ball-joint member in accordance with various aspects of the disclosure.

Aspects of the present disclosure are related to an articulated joint system (also simply referred to as an articulated joint). FIG. 1 is a diagram illustrating a side view of a ball-joint member 100 (also referred to as a bar-bell shaped member) in accordance with various aspects of the disclosure. The ball-joint member 100 may be an elongated member having a spherical shape at each of its ends. For example, the ball-joint member 100 may include a bar 102, a first spherical ball 104 coupled to a first end 105 of the bar 102, and a second spherical ball 106 coupled to a second end 107 of the bar 102. In some aspects of the disclosure, the bar 102, the first spherical ball 104, and/or the second spherical ball 106 may be formed of a rigid material, such as metal (e.g., stainless steel, aluminum, etc.), plastic, a three-dimensional (3D) printed part, or other suitable material.

The ball-joint member 100 may have a length 108. In some examples, the length 108 may be within a range of 10 millimeters (mm) and 5 centimeters (cm). The bar 102 may have a length 110 and a width 112. In some examples, the bar 102 may be a solid circular cylinder. In these examples, the length 110 may represent the height of the circular cylinder and the width 112 may represent the diameter of the circular cylinder. In some examples, the length 110 may be within a range of 5 mm and 4.8 cm and the width 112 may be within a range of 1 mm to 5 mm.

The first spherical ball 104 may have a first diameter 114 and the second spherical ball 106 may have a second diameter 116. In some aspects of the disclosure, the first and second diameters 114, 116 may be equal. In some examples, the first and second diameters 114, 116 may each be within a range of 2 mm to 10 mm.

Figure 2A:
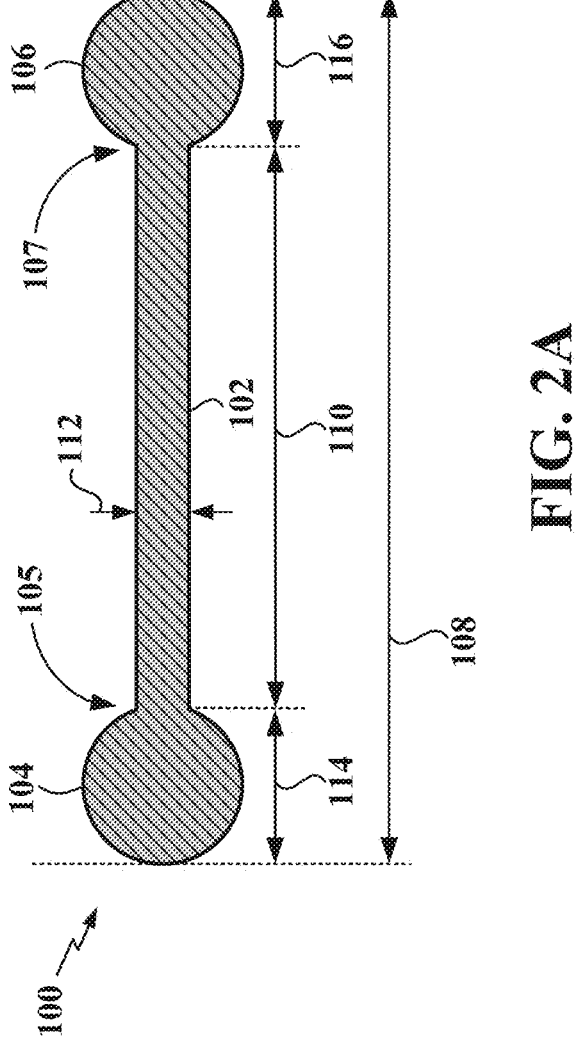
FIGS. 2A and 2B illustrate a cross-sectional view of the ball-joint member along line 1-1 in FIG. 1 in accordance with various aspects of the disclosure.

In some aspects of the disclosure, the ball-joint member 100 may be formed as a single unit or piece. For example, the ball-joint member 100 may be a solid billet machined part. This is shown in FIG. 2A, which is a cross-sectional view of the ball-joint member 100 along line 1-1 in FIG. 1.

In other aspects of the disclosure, the bar 102 and the first and second spherical balls 104, 106 may be separately formed and later coupled together to form the ball-joint member 100 using one or more fastening techniques. In one example, the first and second spherical balls 104, 106 may be laser welded to the bar. In another example, the first and second spherical balls 104, 106 may be screwed onto respective ends of the bar 102. For example, the first and second spherical balls 104, 106 may each include a threaded hole and the bar 102 may include one or more threaded portions. Therefore, the first and second spherical balls 104, 106 may be screwed onto the threaded portions of the bar 102. This is described with reference to FIG. 2B, which is a cross-sectional view of the ball-joint member 100 along line 1-1 in FIG. 1.

5

Figure 2B:
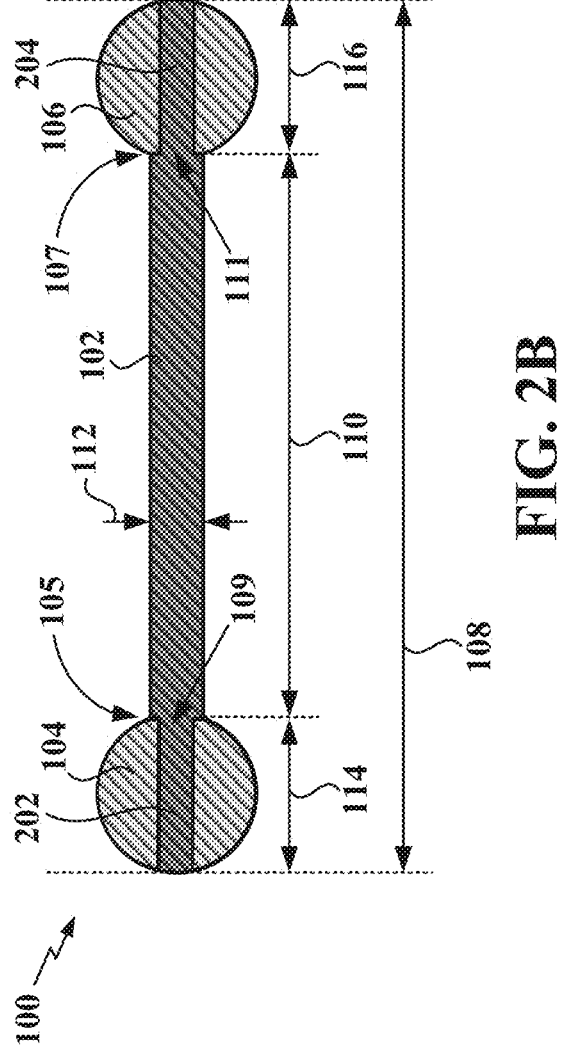

In FIG. 2B, a first portion 202 and a second portion 204 of the bar 102 may be threaded (or at least partially threaded). The first spherical ball 104 may include a first threaded hole 109 that enables coupling of the first spherical ball 104 to the first end 105 of the bar 102. The second spherical ball 106 may include a second threaded hole 111 that enables coupling of the second spherical ball 106 to the second end 107 of the bar 102. In some examples, an epoxy or other adhesive may be applied to the first and second portions 202, 204 of the bar 102 to ensure that the first and second spherical balls 104, 106 do not separate from the bar 102.

Figure 3:
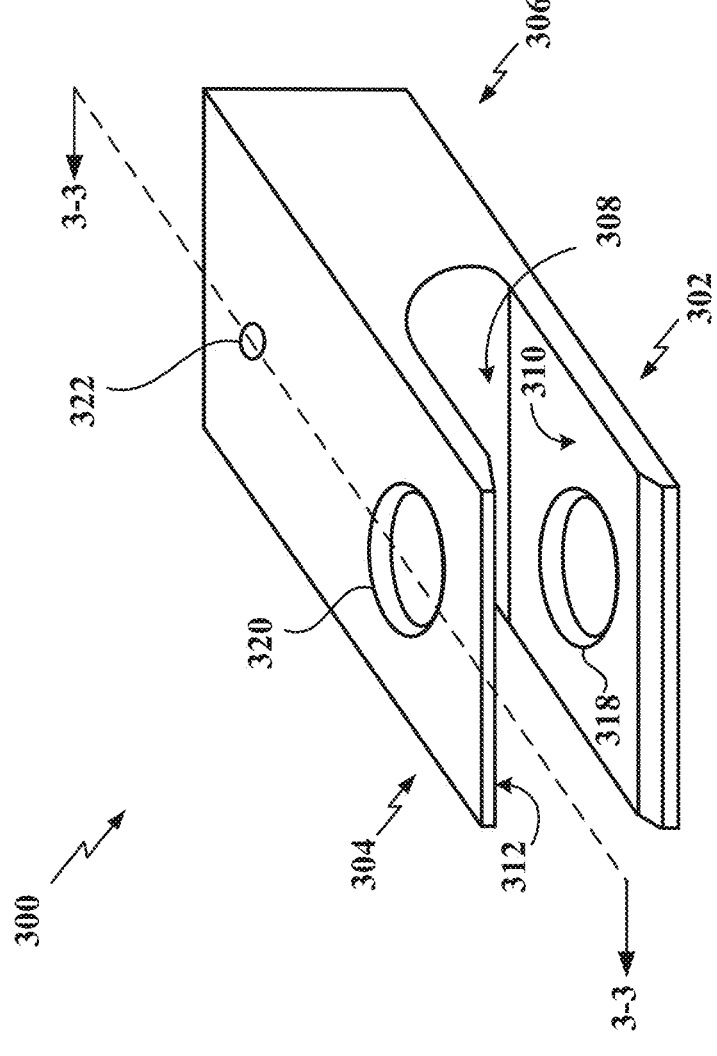
FIG. 3 is a diagram illustrating a rotatable joint member in accordance with various aspects of the disclosure.

FIG. 3 is a diagram illustrating a rotatable joint member 300 in accordance with various aspects of the disclosure. The rotatable joint member 300 includes a first socket joint element 302, a second socket joint element 304, and a base portion 306. The first and second socket joint elements 302, 304 are coupled to the base portion 306 and situated apart to provide a socket cavity 308 between the first and second socket joint elements 302, 304. For example, an inner surface of the first socket joint element 302 may define a first cavity wall 310 and an inner surface of the second socket joint element 304 may define a second cavity wall 312.

In some aspects of the disclosure, the first socket joint element 302 may include a first socket retaining hole 318 and the second socket joint element 304 may include a second socket retaining hole 320. In other aspects of the disclosure, the first socket joint element 302 may include a first concave region in place of the retaining hole 318 and/or the second socket joint element 304 may include a second concave region in place of the second socket retaining hole 320. In some aspects of the disclosure, the base portion 306 of the rotatable joint member 300 may include a hole 322.

Figure 4:
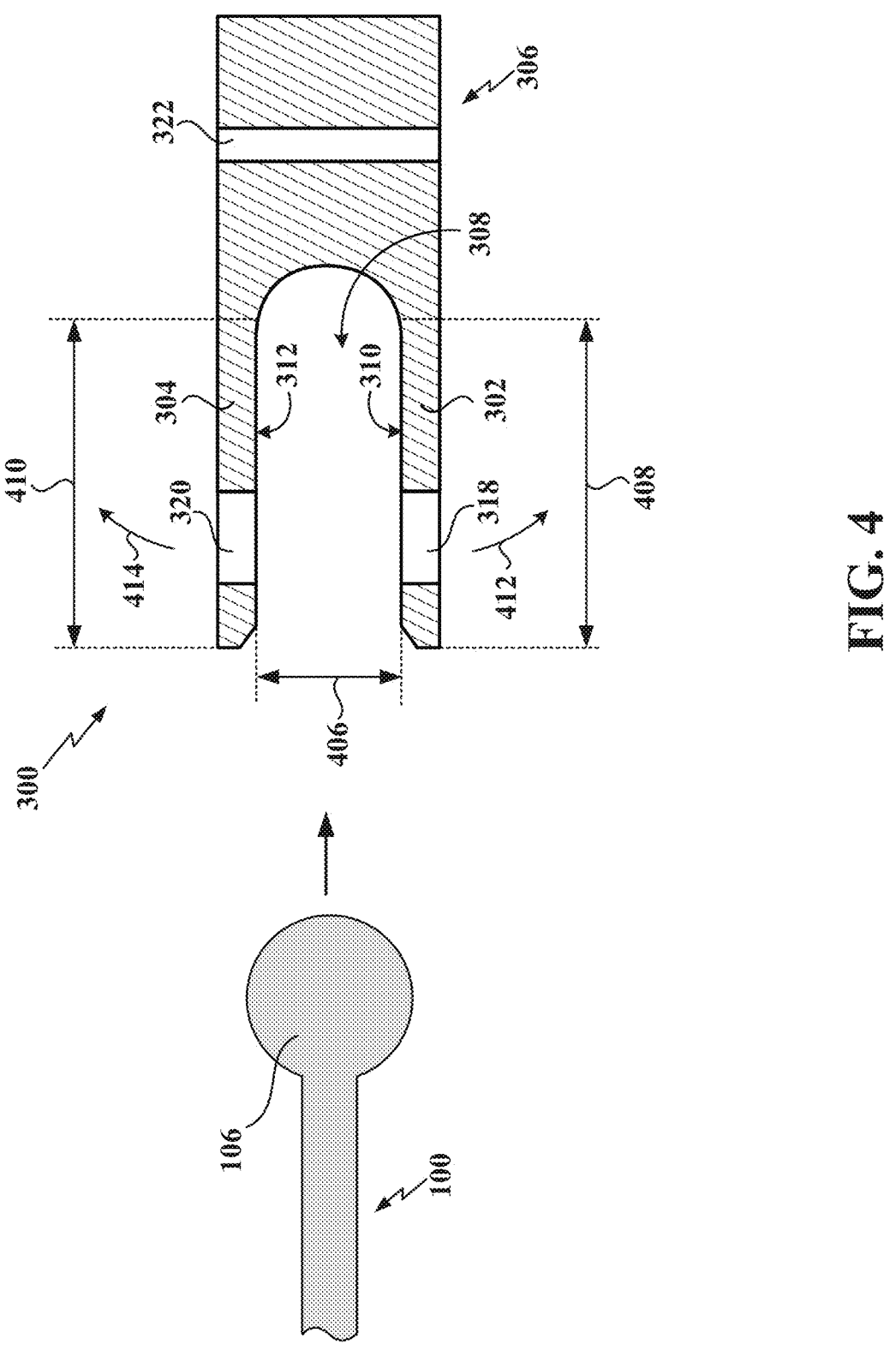
FIG. 4 is a diagram illustrating a cross-section of the rotatable joint member shown in FIG. 3 along the line 3-3.

FIG. 4 is a diagram illustrating a cross-section of the rotatable joint member 300 shown in FIG. 3 along the line 3-3. As shown in FIG. 4, the first socket joint element 302 may have a first length 408 and the second socket joint element 304 may have a second length 410. In some aspects of the disclosure, the first and second lengths 408, 410 may be approximately equal. As further shown in FIG. 4, the first cavity wall 310 may be a distance 406 apart from the second cavity wall 312.

In some aspects of the disclosure, the first spherical ball 104 or the second spherical ball 106 of the ball-joint member 100 may be inserted into the socket cavity 308. For example, when the second spherical ball 106 is forcibly inserted into the socket cavity 308, the first socket joint element 302 may deflect outward in a first direction 412 and the second socket joint element 304 may deflect outward in a second direction 414. This may temporarily increase the distance 406 to allow the second spherical ball 106 to enter the socket cavity 308 and snap into place. Accordingly, the first and second socket joint elements 302, 304 may return to their original positions when the second spherical ball 106 is firmly seated in the first and second socket retaining holes 318, 320 and moveably secured in the socket cavity 308 as shown in FIG. 5.

In some aspects of the disclosure, the first socket joint element 302 may include a first concave region in the first cavity wall 310 in addition to or in lieu of the retaining hole 318. In some aspects of the disclosure, the second socket joint element 304 may include a second concave region in the second cavity wall 312 in addition to or in lieu of the retaining hole 320.

Figure 5:
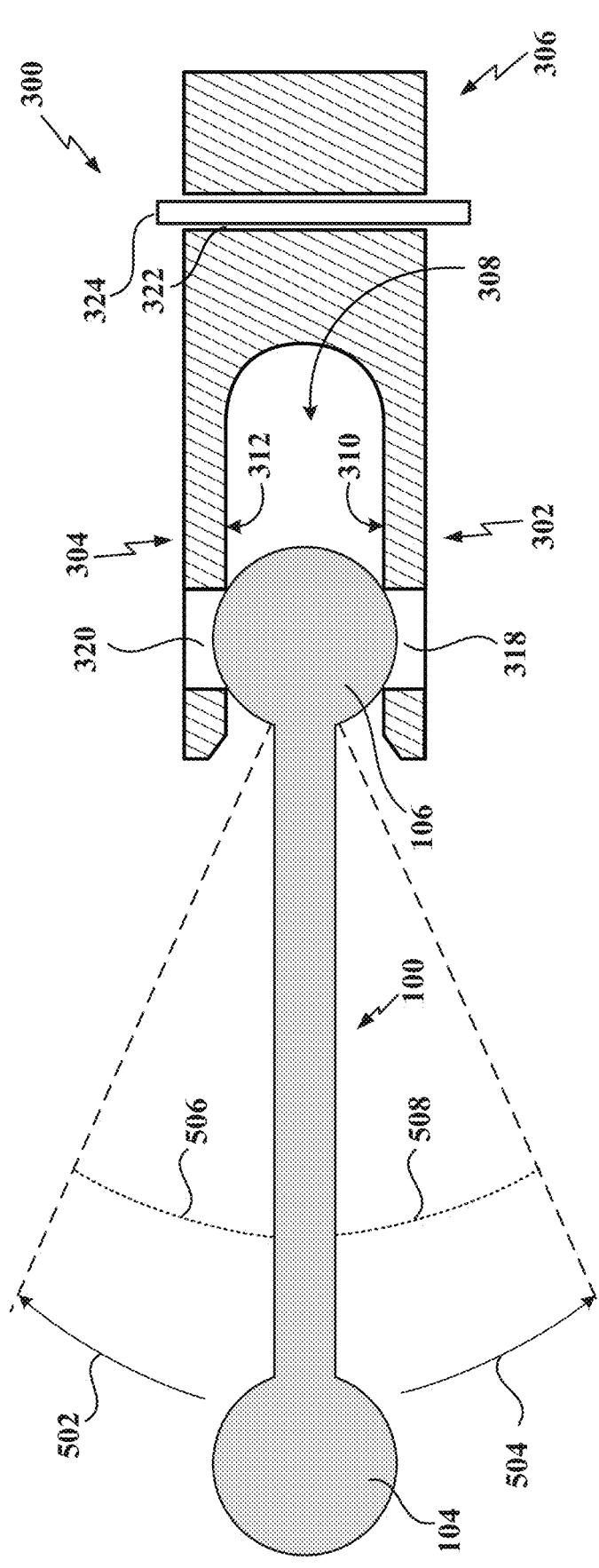
FIG. 5 is a diagram illustrating a cross-section of the rotatable joint member shown in FIG. 3 along the line 3-3 when the ball-joint member is moveably secured in the socket cavity.

FIG. 5 is a diagram illustrating a cross-section of the rotatable joint member 300 shown in FIG. 3 along the line 3-3 when the ball-joint member 100 is moveably secured in the socket cavity 308. As shown in FIG. 5, the first spherical ball 104 of the ball-joint member 100 may move in a first vertical direction 502 (e.g., an upward direction) and may move in a second vertical direction 504 (e.g., a downward direction). The ball-joint member 100 may have a first vertical range of motion 506 (e.g., an upward range of motion) and may have a second vertical range of motion 508 (e.g., a downward range of motion). In some examples, the first vertical range of motion 506 and the second vertical range of motion 508 may each be approximately 25 degrees.

In some examples, a rod 324 may be placed through the third hole 322 to enable the rotatable joint member 300 to freely rotate about the rod 324. In the aspects described herein, a rod about which a rotatable joint member may freely rotate may be referred to as an axial member. In some aspects of the disclosure, the rotatable joint member 300 may rotate in response to a force applied to the ball-joint member 100. In some aspects of the disclosure, the first range of motion 506 and the second range of motion 508 may allow the ball-joint member 100 to misalign relative to the rotatable joint member 300.

Figure 6:
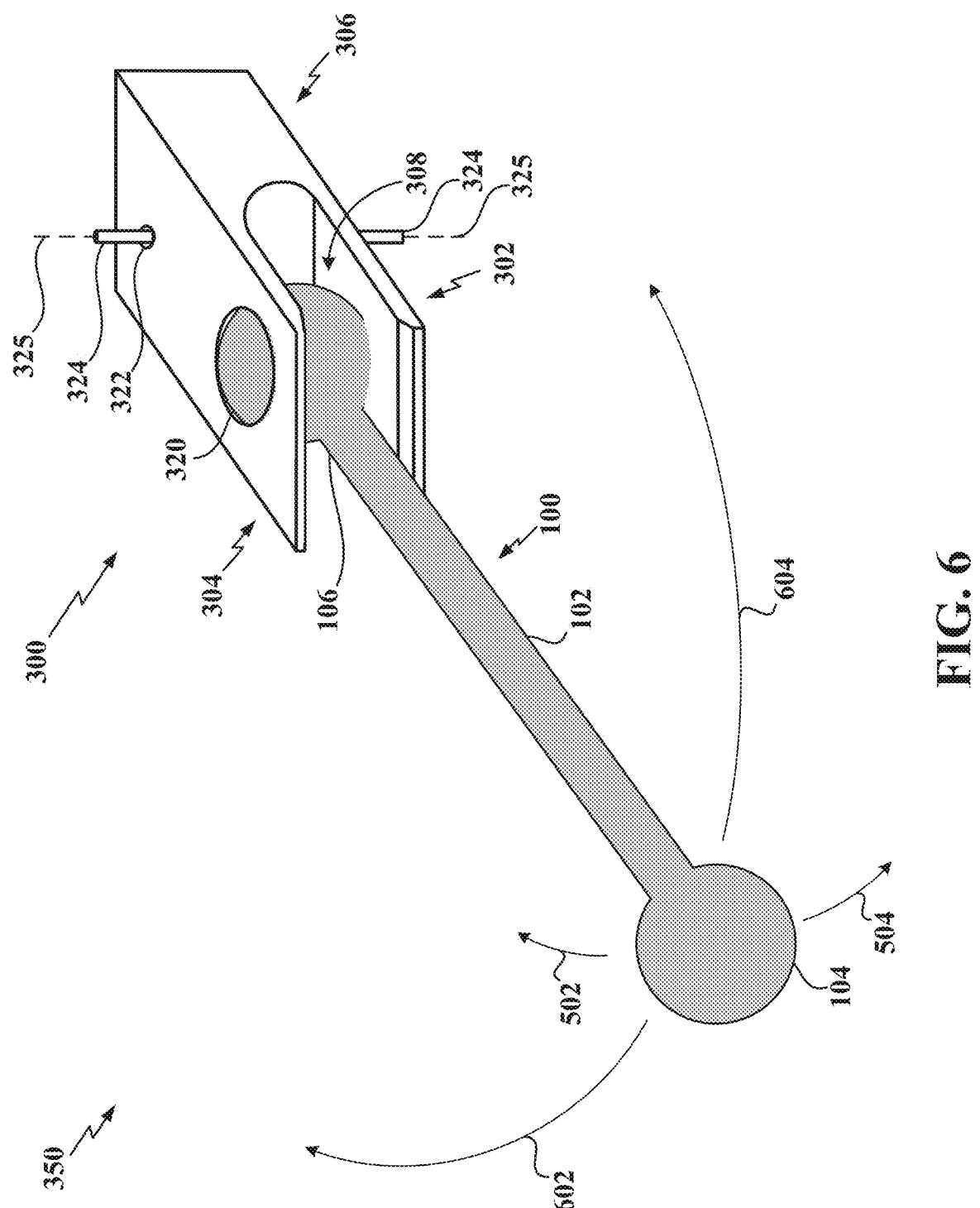
FIG. 6 is a diagram illustrating a perspective view of the rotatable joint member when the ball-joint member is moveably secured in the socket cavity.
Figure 7A:
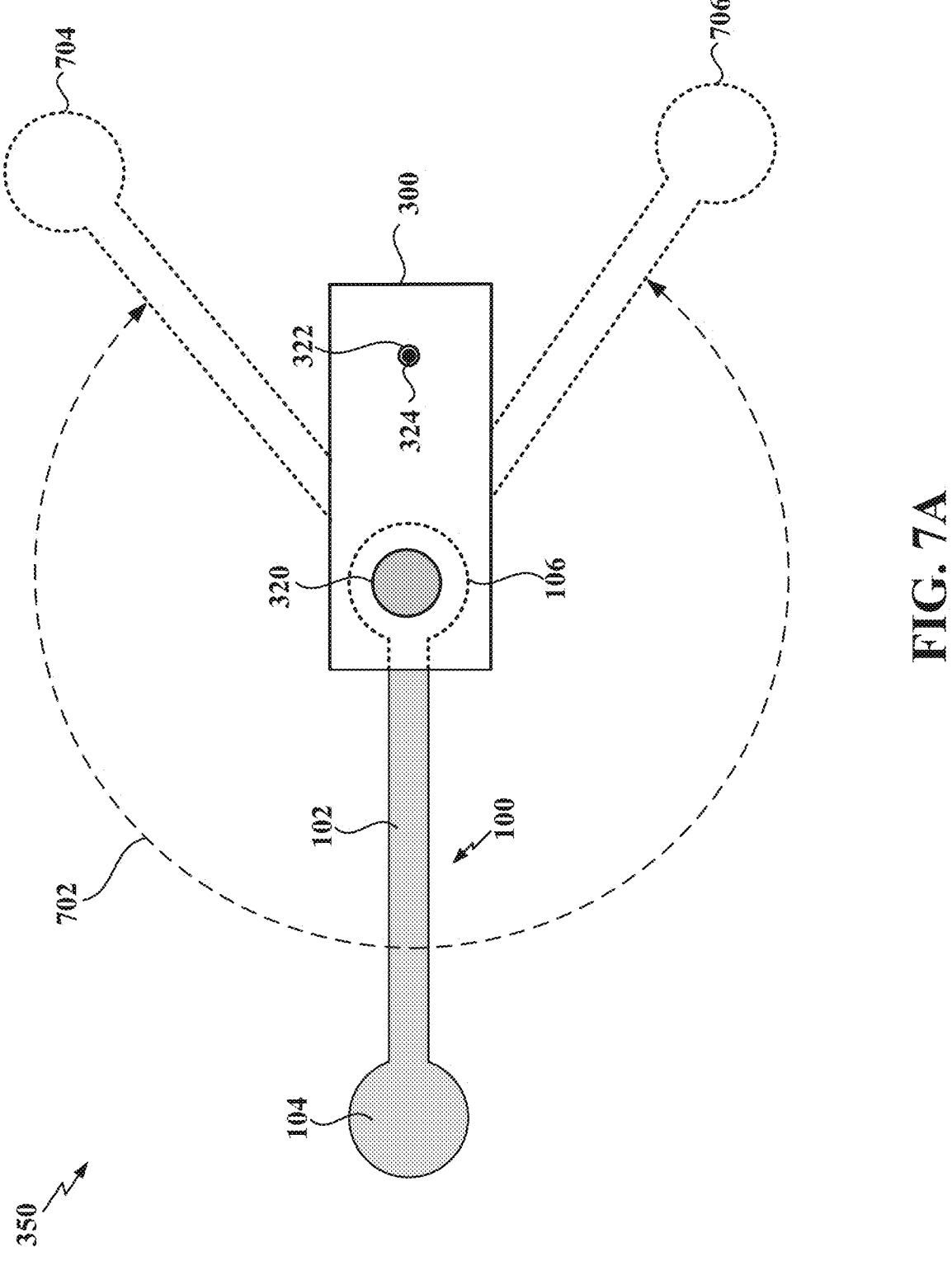
FIG. 7A is a top view of the articulated joint including the rotatable joint member and the ball-joint member shown in FIG. 6.

FIG. 6 is a diagram illustrating a perspective view of the rotatable joint member 300 when the ball-joint member 100 is moveably secured in the socket cavity 308. As shown in FIG. 7A, the first spherical ball 104 of the ball-joint member 100 may move in a first lateral direction 602 and may move in a second lateral direction 604. The lateral range of motion of the ball-joint member 100 will be described with reference to FIG. 7A.

A ball-joint member, such as the ball-joint member 100, together with a rotatable joint-member, such as the rotatable, joint member 300, may form an articulated joint 350 in accordance with various aspects of the disclosure. For example, the ball-joint member 100 may be used to transfer a force to the rotatable joint member 300, which may cause a rotation of the rotatable joint member 300 about an axis 325 defined by the rod 324. In some implementations, the force may be delivered to the ball-joint member 100 via a rotation of another rotatable joint member as described with reference to FIGS. 8A and 8B.

FIG. 7A is a top view of the articulated joint 350 including the rotatable joint member 300 and the ball-joint member 100 shown in FIG. 6. As shown in FIG. 7A, the ball-joint member 100 may have a lateral range of motion 702. For example, the lateral range of motion 702 may allow the first spherical ball 104 of the ball-joint member 100 to rotate about the second spherical ball 106 from a first position 704 to a second position 706. In some examples, the lateral range of motion 702 may be approximately 270 degrees.

Figure 7B:
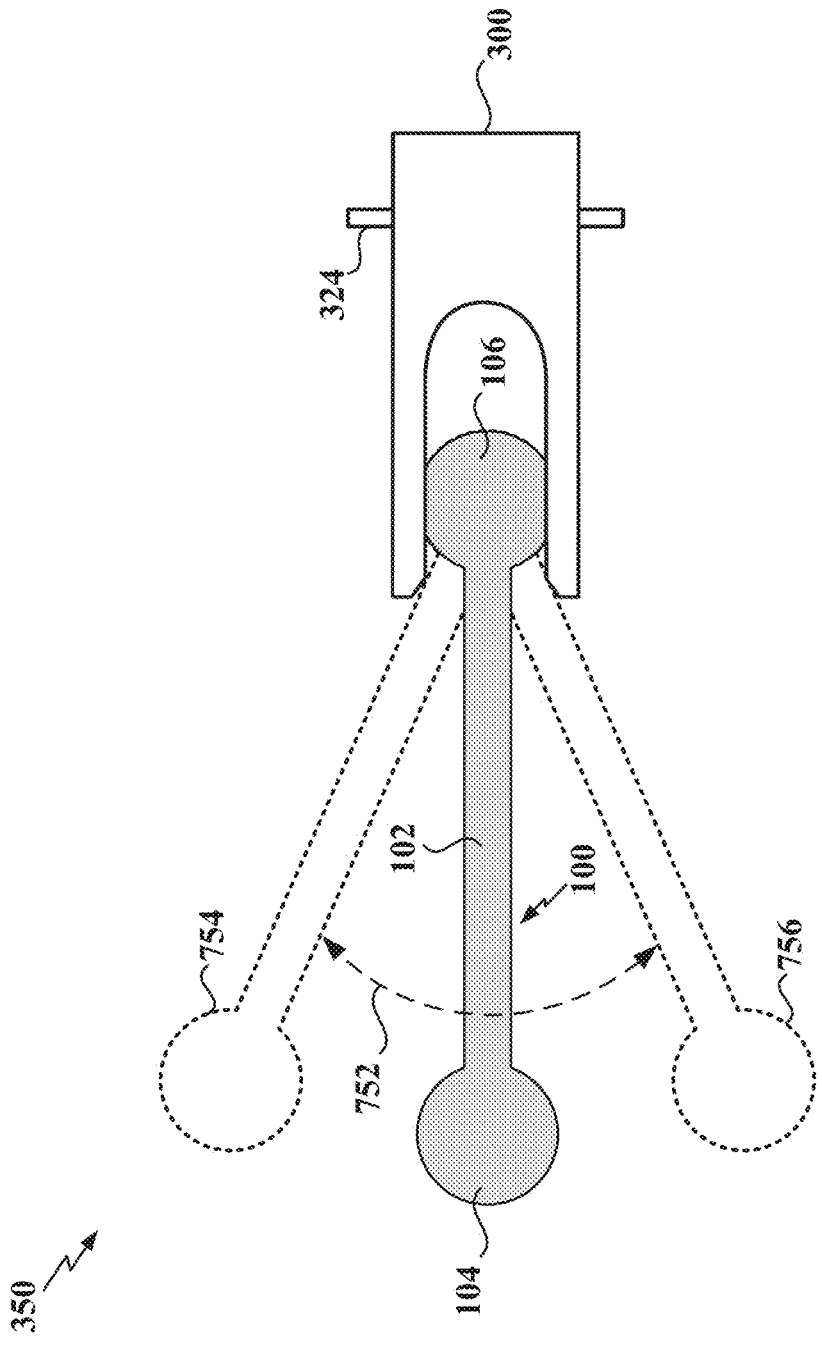
FIG. 7B is a side view of the articulated joint including the rotatable joint member and the ball-joint member shown in FIG. 6.

FIG. 7B is a side view of the articulated joint 350 including the rotatable joint member 300 and the ball-joint member 100 shown in FIG. 6. As shown in FIG. 7B, the ball-joint member 100 may have a vertical range of motion 752. For example, the vertical range of motion 752 may allow the first spherical ball 104 of the ball-joint member 100 to rotate about the second spherical ball 106 from a first position 754 to a second position 756. In some examples, the vertical range of motion 752 may be approximately 50 degrees.

Figure 7C:
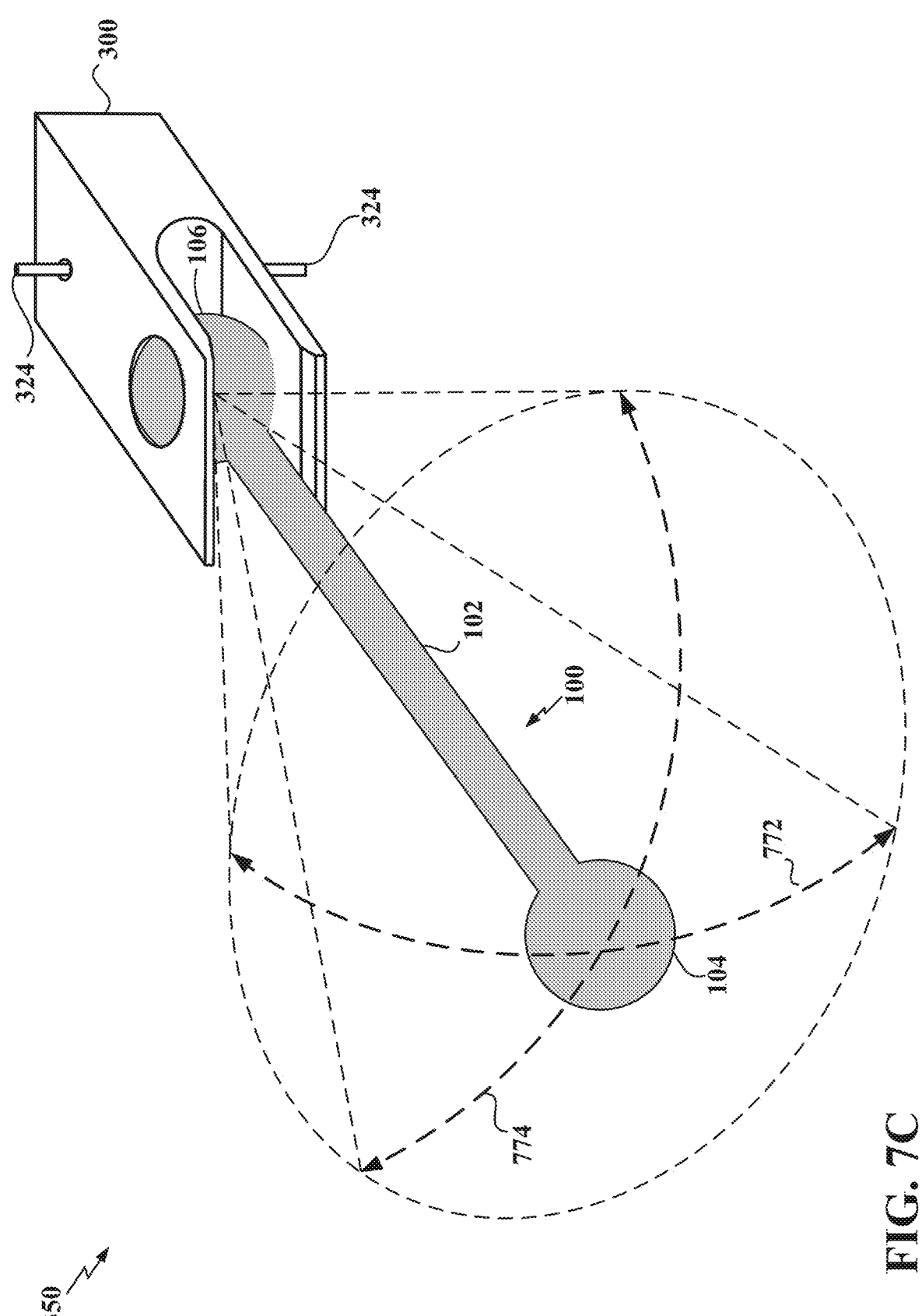
FIG. 7C is a perspective view of the articulated joint illustrating an exemplary conical range of motion of the ball-joint member.

In some aspects, portions of the lateral range of motion 702 of the ball-joint member 100 together with portions of the vertical range of motion 752 of the ball-joint member 100 may provide a conical range of motion for the ball-joint member 100. For example, FIG. 7C is a perspective view of the articulated joint 350 illustrating an exemplary conical range of motion of the ball-joint member 100.

Figures 8A, 8B:
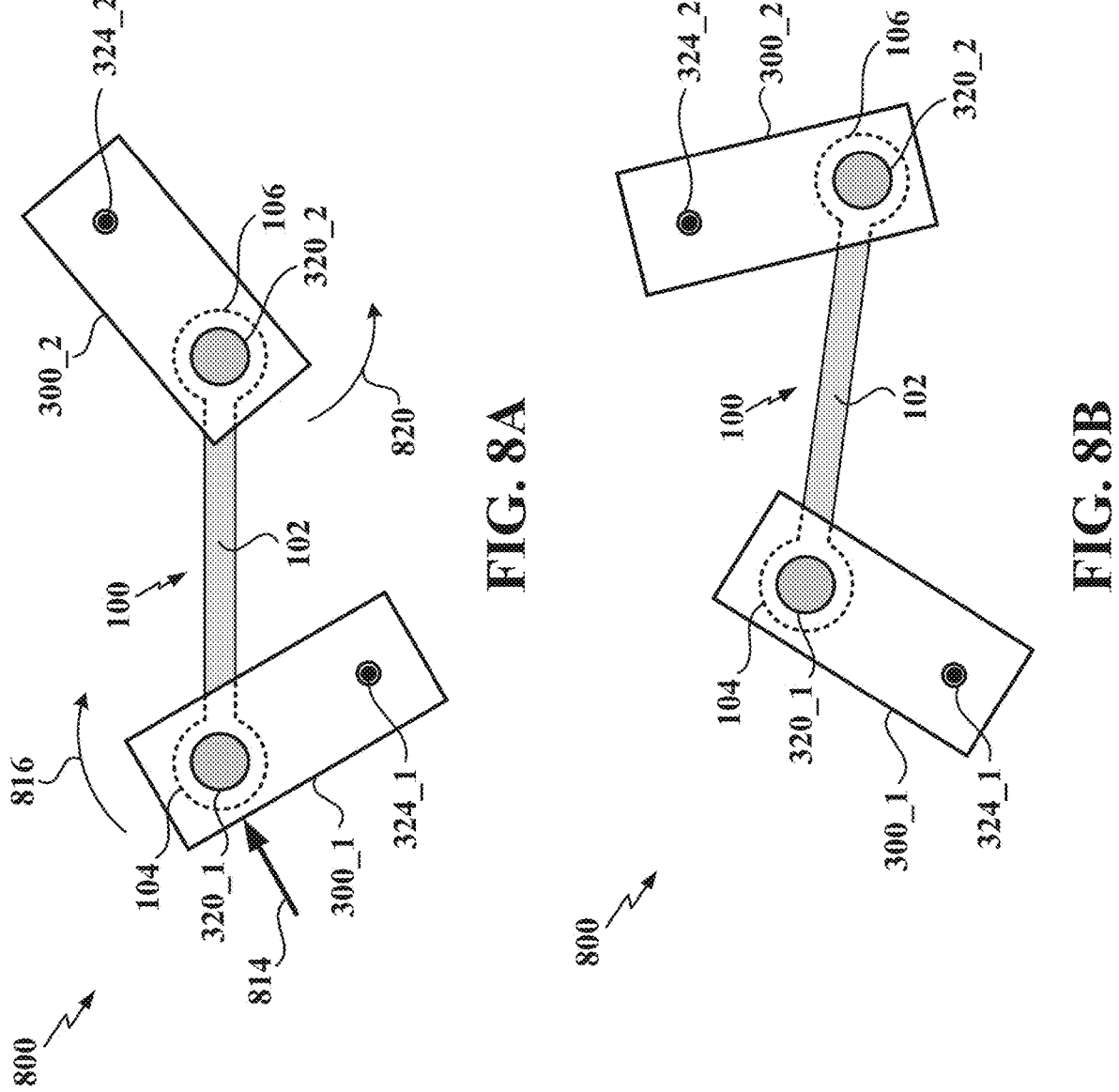
FIGS. 8A and 8B illustrate an example of a linkage of articulated joints in accordance with various aspects of the disclosure.

FIGS. 8A and 8B illustrate an example of a linkage 800 of articulated joints in accordance with various aspects of the disclosure. As shown in FIGS. 8A and 8B, the linkage 800 of articulated joints includes a first rotatable joint member 300_1, a second rotatable joint member 300_2, and the ball-joint member 100. The first and second rotatable joint members 300_1, 300_2 may each be the previously described rotatable joint member 300.

With reference to FIG. 8A, the first rotatable joint member 300_1 may be coupled to the second rotatable joint member 300_2 via the ball-joint member 100. For example, the first spherical ball 104 of the ball-joint member 100 may be moveably secured in a socket cavity of the first rotatable joint member 300_1 and the second spherical ball 106 of the ball-joint member 100 may be moveably secured in a socket cavity of the second rotatable joint member 300_2.

The first rotatable joint member 300_1 may be free to rotate about a first rod 324_1 (e.g., about a first axis defined by the first rod 324_1) and the second rotatable joint member 300_2 may be free to rotate about a second rod 324_2 (e.g., about a second axis defined by the second rod 324_2). In FIGS. 8A and 8B, the first and second rods 324_1, 324_2 extend lengthwise perpendicular to the page. In the example of FIGS. 8A and 8B, the positions of the first and second rods 324_1, 324_2 are fixed.

As shown in FIG. 8A, a force 814 may be applied to the first rotatable joint member 300_1, which may cause the first rotatable joint member 300_1 to rotate about the first rod 324_1 in a direction 816. The ball-joint member 100 may transfer the force 814 to the second rotatable joint member 300_2, which may cause the second rotatable joint member 300_2 to rotate about the second rod 324_2 in a direction 820. An example of the change in the positions of the first rotatable joint member 300_1, the second rotatable joint member 300_2, and the ball-joint member 100 due to the force 814 are shown in FIG. 8B.

Figures 9A, 9B, 9C:
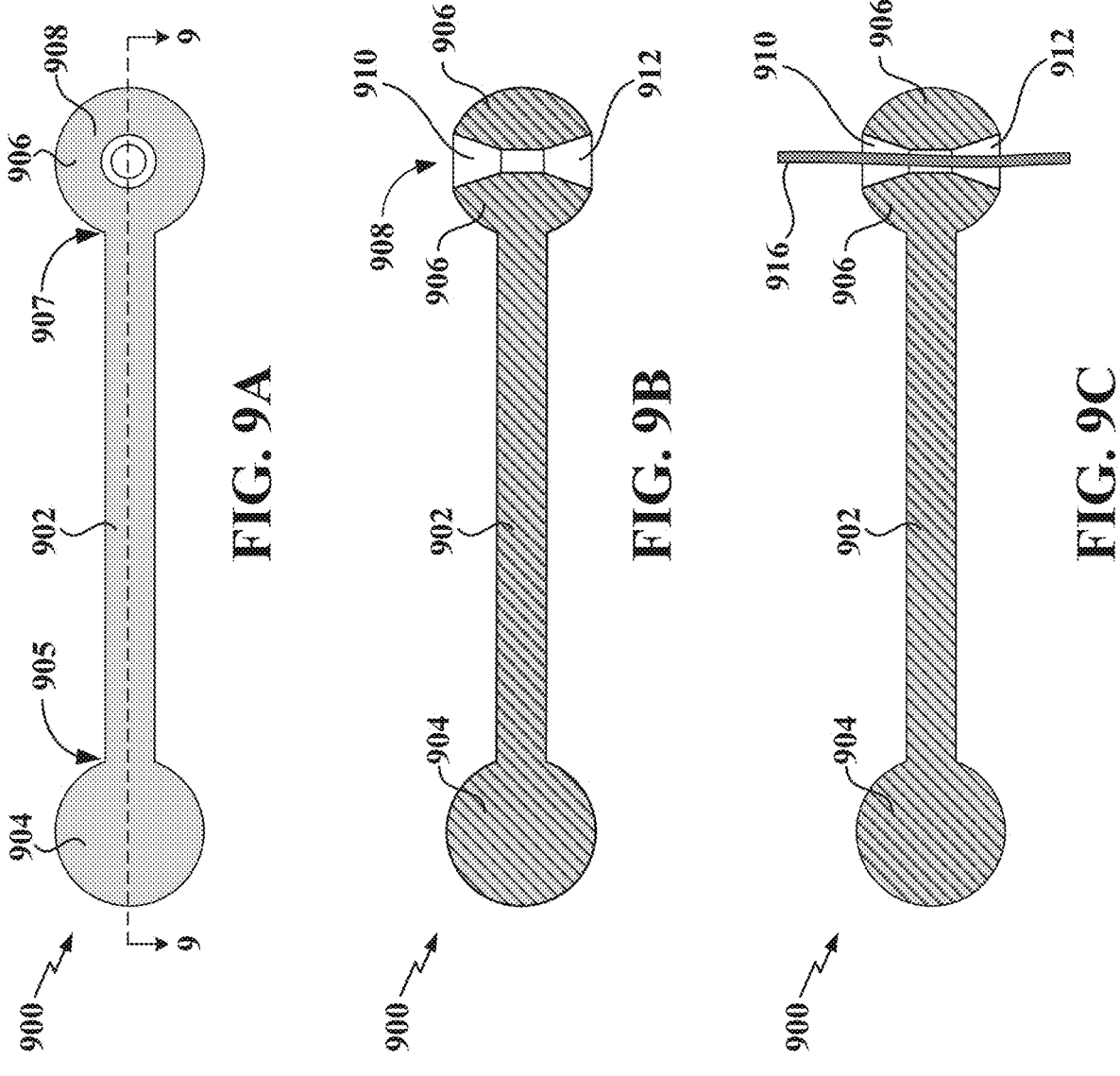
FIGS. 9A. 9B, 9C illustrate aspects of a ball-joint member in accordance with various aspects of the disclosure.

FIGS. 9A, 9B, 9C illustrate aspects of a ball-joint member 900 in accordance with various aspects of the disclosure. FIG. 9A is a diagram illustrating a side view of the ball-joint member 900. The ball-joint member 900 includes a bar 902, a first spherical ball 904 coupled to a first end 905 of the bar 902, and a second spherical ball 906 coupled to a second end 907 of the bar 902. In some aspects of the disclosure, the bar 902, the first spherical ball 904, and/or the second spherical ball 906 may be formed of a rigid material, such as metal (e.g., stainless steel, aluminum, etc.), plastic, a three-dimensional (3D) printed part, or other suitable material. In some aspects of the disclosure, the ball-joint member 900 may be formed as a single unit or piece.

In some aspects of the disclosure, the second spherical ball 906 may include a hole 908. In some examples, the hole 908 may have a conical shape. This is described with reference to FIG. 9B, which is a cross-sectional view of the ball-joint member 900 along line 9-9 in FIG. 9A. In FIG. 9B, the hole 908 may include a first conical opening 910 and a second conical opening 912. In some aspects of the disclosure, with reference to FIG. 9C, a retaining line 916 may be fed through the hole 908. In some examples, the retaining line 916 may be a wire, a cord, a cable, or a string (e.g., a nylon string or a silk string).

Figure 10:
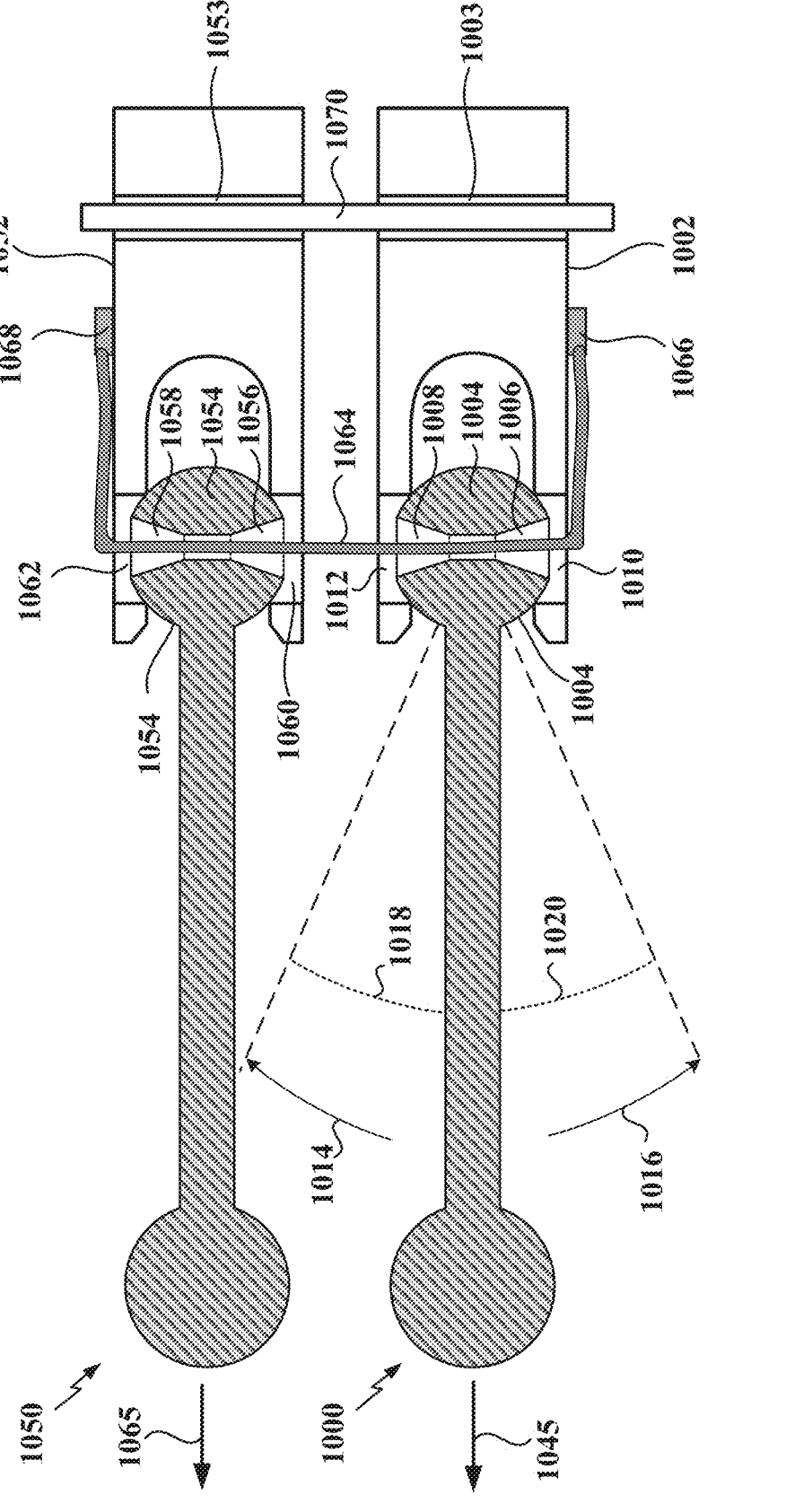
FIG. 10 illustrates a configuration of rotatable joint members in accordance with various aspects of the disclosure.

FIG. 10 illustrates a configuration of rotatable joint members in accordance with various aspects of the disclosure. FIG. 10 is a diagram illustrating a cross-sectional view of a first rotatable joint member 1002 and a second rotatable joint member 1052. A spherical ball 1004 of a first ball-joint member 1000 may be moveably secured in a socket cavity of the first rotatable joint member 1002, and a spherical ball

1054 of a second ball-joint member 1050 may be moveably secured in a socket cavity of the second rotatable joint member 1052.

As shown in FIG. 10, a retaining wire 1064 may extend through a first hole 1010 of the first rotatable joint member 1002, a first conical opening 1006 in the spherical ball 1004, a second conical opening 1008 in the spherical ball 1004, a second hole 1012 of the first rotatable joint member 1002, a first hole 1060 of the second rotatable joint member 1052, a first conical opening 1056 in the spherical ball 1054, a second conical opening 1058 in the spherical ball 1054, and a second hole 1062 of the second rotatable joint member 1052. In some aspects of the disclosure, the retaining wire 1064 may terminate at a first terminal 1066 and a second terminal 1068. In some examples, the first terminal 1066 may be coupled to the first rotatable joint member 1002, and the second terminal 1068 may be coupled to the second rotatable joint member 1052.

For example, the first terminal 1066 may be coupled to the first rotatable joint member 1002 using a fastener (e.g., a screw), an adhesive, or other suitable device or material. Similarly, the second terminal 1068 may be coupled to the second rotatable joint member 1052 using a fastener (e.g., a screw), an adhesive, or other suitable device or material.

In some scenarios, the retaining wire 1064 may prevent the spherical ball 1004 from detaching from the first rotatable joint member 1002 when an excessive force is applied to the first ball-joint member 1000 in a direction 1045. The retaining wire 1064 may further prevent the spherical ball 1054 from detaching from the second rotatable joint member 1052 when an excessive force is applied to the second ball-joint member 1050 in a direction 1065.

It should be noted that the conical openings of the spherical balls in FIG. 10 may maintain the range of motion provided by the first and second rotatable joint members 1002, 1052. For example, with reference to FIG. 10, the first and second conical openings 1006, 1008 of the spherical ball 1004 allow the ball-joint member 1000 to move in a first vertical direction 1014 (e.g., an upward direction) and to move in a second vertical direction 1016 (e.g., a downward direction). The first ball-joint member 1000 may have a first vertical range of motion 1018 (e.g., an upward range of motion) and may have a second vertical range of motion 1020 (e.g., a downward range of motion). In some examples, the first vertical range of motion 1018 and the second vertical range of motion 1020 may each be approximately 25 degrees.

In some examples, the first and second rotatable joint members 1002, 1052 may include holes 1003, 1053, and a rod 1070 may be fed through the holes 1003, 1053 to enable the first and second rotatable joint members 1002, 1052 to freely rotate about the rod 1070.

Figure 11:
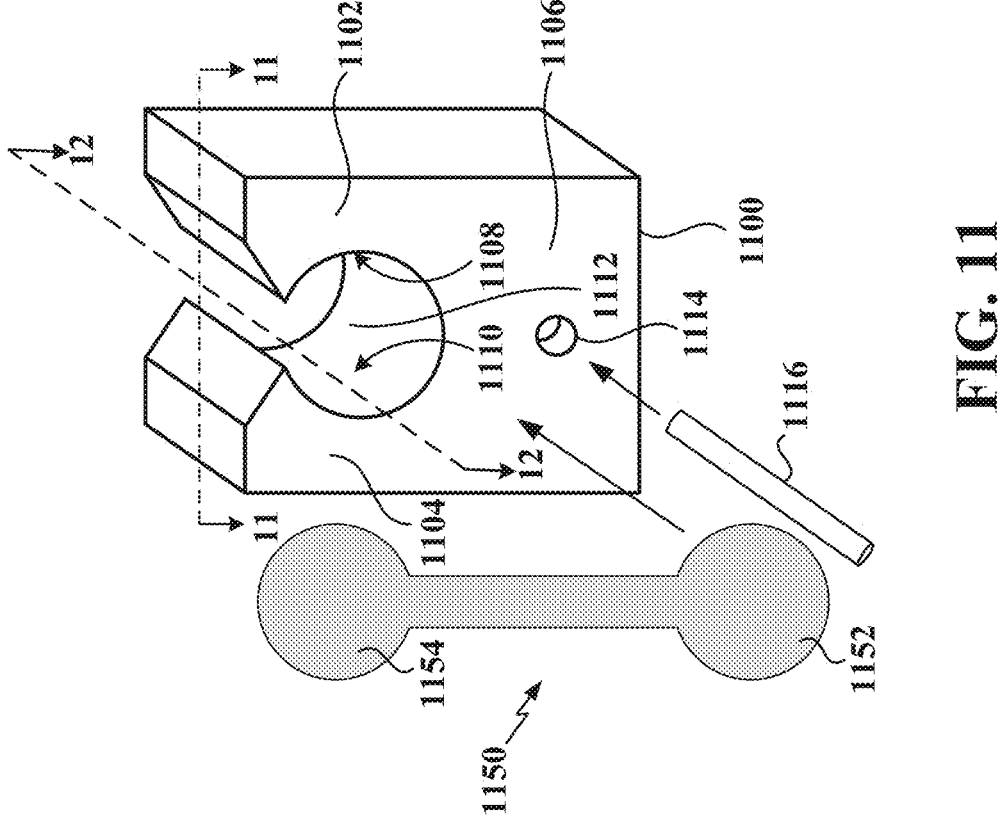
FIG. 11 illustrates a rotatable joint member and a ball-joint member in accordance with various aspects of the disclosure.

FIG. 11 illustrates a rotatable joint member 1100 and a ball-joint member 1150 in accordance with various aspects of the disclosure. As shown in FIG. 11, the rotatable joint member 1100 includes a first socket joint element 1102, a second socket joint element 1104, and a base portion 1106. As shown in FIG. 11, the rotatable joint member 1100 may include a socket cavity 1112 configured to receive either one of spherical balls 1152, 1154 of the ball-joint member 1150.

The first and second socket joint elements 1102, 1104 are situated apart to provide the socket cavity 1112 between the first and second socket joint elements 1102, 1104. For example, an inner surface of the first socket joint element 1102 may define a first cavity wall 1108 and an inner surface of the second socket joint element 1104 may define a second cavity wall 1110.

In some aspects of the disclosure, the base portion 1106 of the rotatable joint member 1100 may include a hole 1114. The hole 1114 may extend through the base portion 1106. In some examples, a rod 1116 may be fed through the hole 1114 to enable the rotatable joint member 1100 to freely rotate about the rod 1116.

Figure 12:
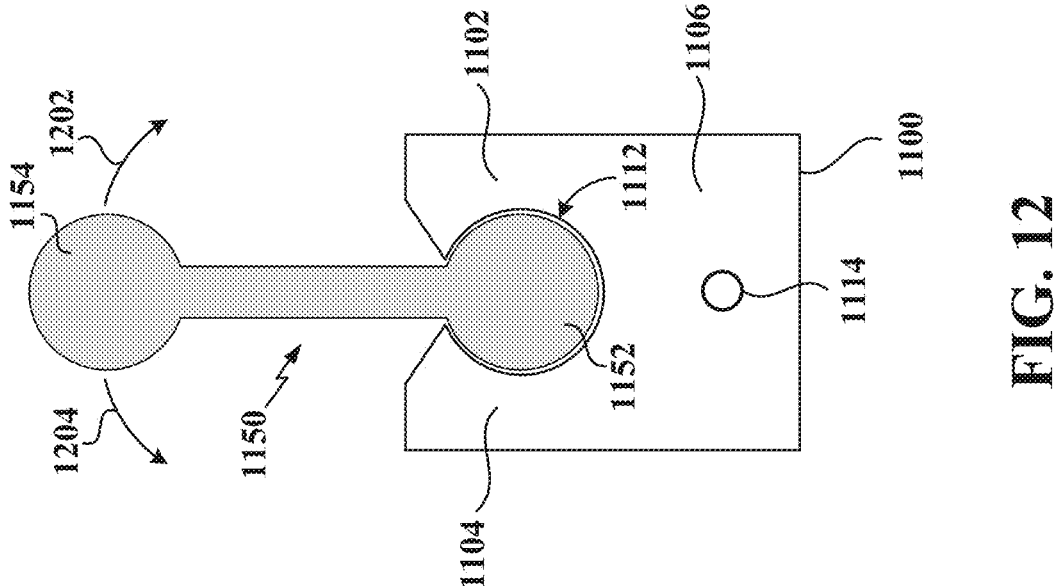
FIG. 12 is a diagram illustrating a cross-section of the rotatable joint member shown in FIG. 11 along the line 11-11.

FIG. 12 is a diagram illustrating a cross-section of the rotatable joint member 1100 shown in FIG. 11 along the line 11-11. As shown in FIG. 12, the spherical ball 1152 may be situated in the socket cavity 1112. The rotatable joint member 1100 may rotate in a first direction 1202 and a second direction 1204.

Figure 13:
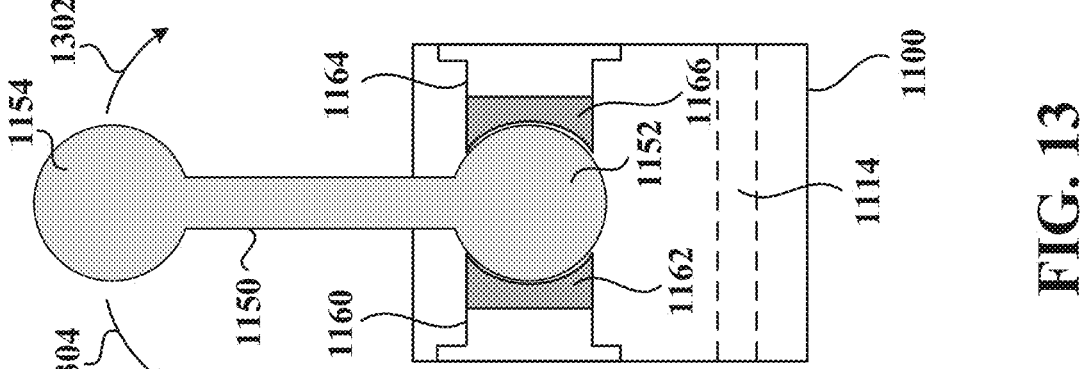
FIG. 13 is a diagram illustrating a cross-section of the rotatable joint member shown in FIG. 11 along the line 12-12.

FIG. 13 is a diagram illustrating a cross-section of the rotatable joint member 1100 shown in FIG. 11 along the line 12-12. The spherical ball 1152 may be moveably secured in the socket cavity 1112 (shown in FIG. 11) with a first cavity plug 1160 and a second cavity plug 1164. For example, the first cavity plug 1160 may fit in one side of the socket cavity 1112 and the second cavity plug 1164 may fit in the other side of the socket cavity 1112. In some examples, the first and second cavity plugs 1160, 1164 may prevent the spherical ball 1152 from detaching from the rotatable joint member 1100. As indicated in FIG. 13, the rotatable joint member 1100 may rotate in a first direction 1302 and a second direction 1304.

In some aspects of the disclosure, the first cavity plug 1160 may include a first cup portion 1162. The first cup portion 1162 may have a concave shape to accommodate the shape of the spherical ball 1152. In some examples, the first cup portion 1162 may be formed of a rigid material, such as a metal or plastic. In some aspects of the disclosure, the second cavity plug 1164 may include a second cup portion 1166. The second cup portion 1166 may have a concave shape to accommodate the shape of the spherical ball 1152. In some examples, the second cup portion 1166 may be formed of a rigid material, such as a metal or plastic.

In some aspects of the disclosure, the socket cavity 1112 may extend partially through the rotatable joint member 1100. In these aspects, only one cavity plug (e.g., the first cavity plug 1160) may be used to moveably secure the spherical ball 1152 in the socket cavity 1112.

Figure 14B:
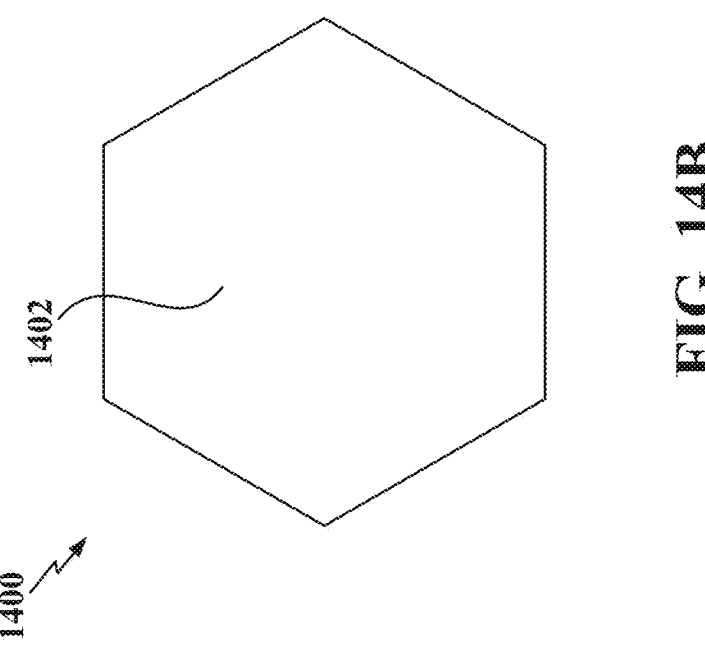
FIGS. 14A and 14B illustrate an example of a cavity plug in accordance with various aspects of the disclosure.
Figure 14A:
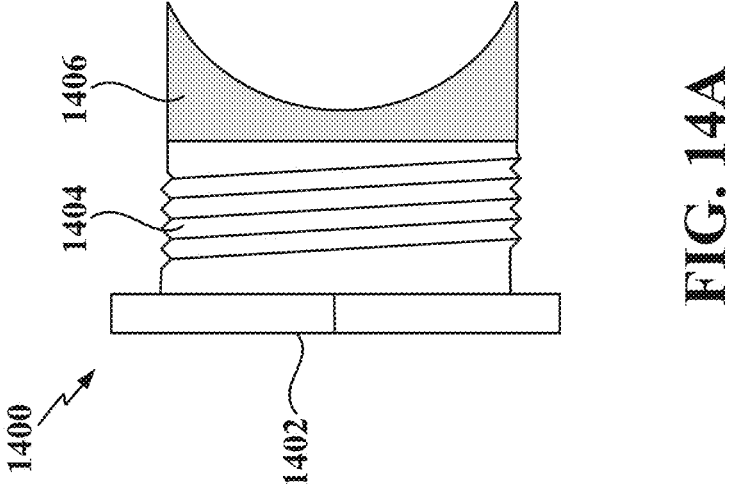

FIGS. 14A and 14B illustrate an example of a cavity plug in accordance with various aspects of the disclosure. FIG. 14A shows a side view of a cavity plug 1400. The cavity plug 1400 includes a threaded portion 1404 and a cup portion 1406. In some aspects of the disclosure, the cavity plug 1400 may include a head 1402 for driving the cavity plug 1400 into a socket cavity. For example, with reference to the front view of the cavity plug 1400 shown in FIG. 14B, the head 1402 may be a hex shaped socket head. In other aspects, the head 1402 may be a Philips head type, a flat head type, or any other suitable head type.

Figure 15B:
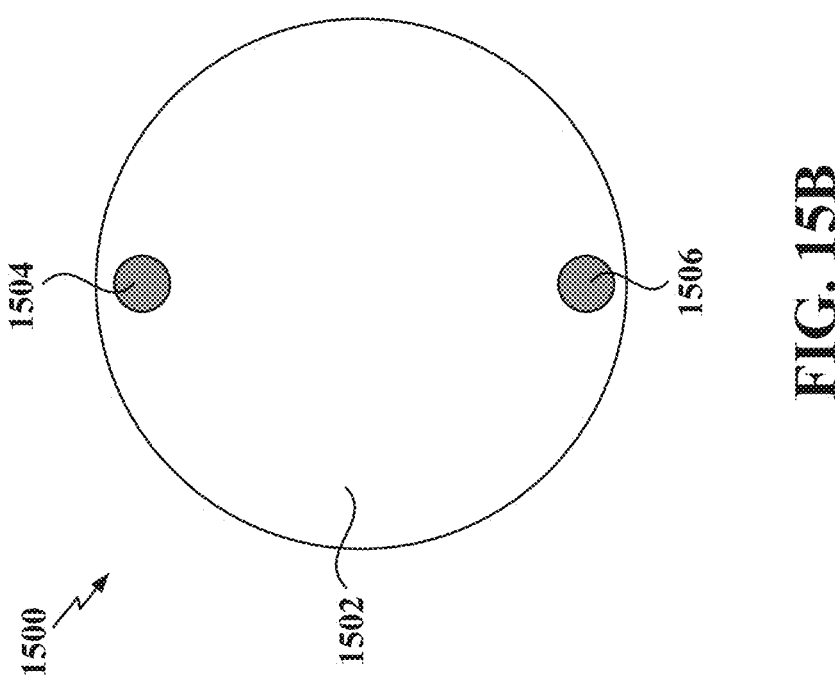
FIGS. 15A and 15B illustrate an example of a cavity plug in accordance with various aspects of the disclosure.
Figure 15A:
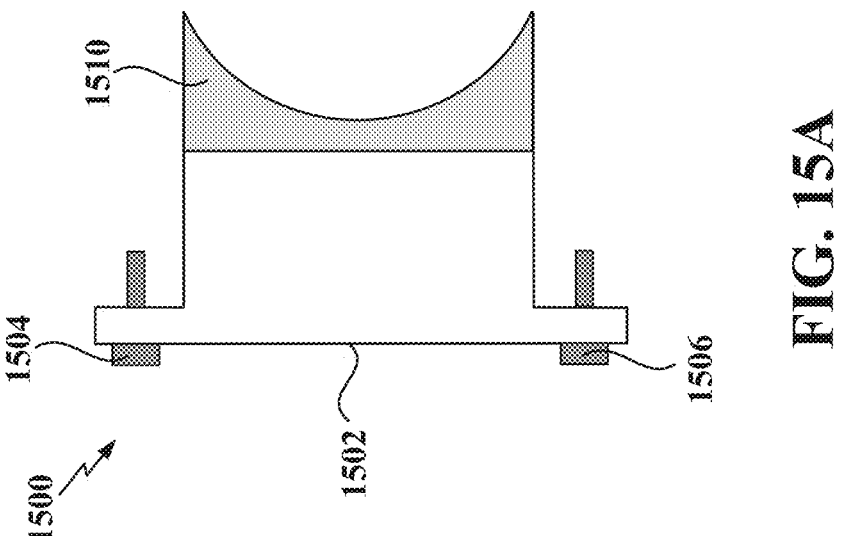

FIGS. 15A and 15B illustrate an example of a cavity plug in accordance with various aspects of the disclosure. FIG. 15A shows a side view of a cavity plug 1500. As shown in FIG. 15A, the cavity plug 1500 may include a head portion 1502, fasteners 1504, 1506 and a cup portion 1510. In some aspects of the disclosure, the first and second fasteners 1504, 1506 may be used to attach the cavity plug 1500 to a surface of the rotatable joint member 1100. For example, with reference to the front view of the cavity plug 1500 shown in FIG. 15B, the first and second fasteners 1504, 1506 may be situated near the edges of the head 1502.

Figure 16B:
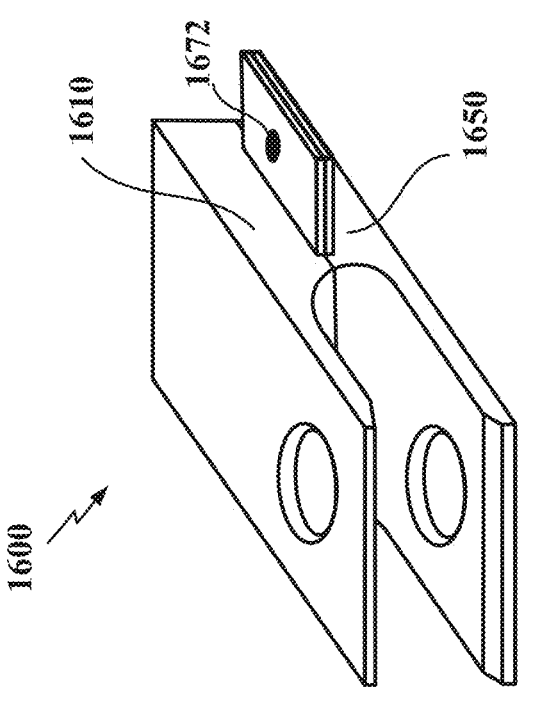
FIGS. 16A and 16B illustrate a rotatable joint member in accordance with various aspects of the disclosure.
Figure 16A:
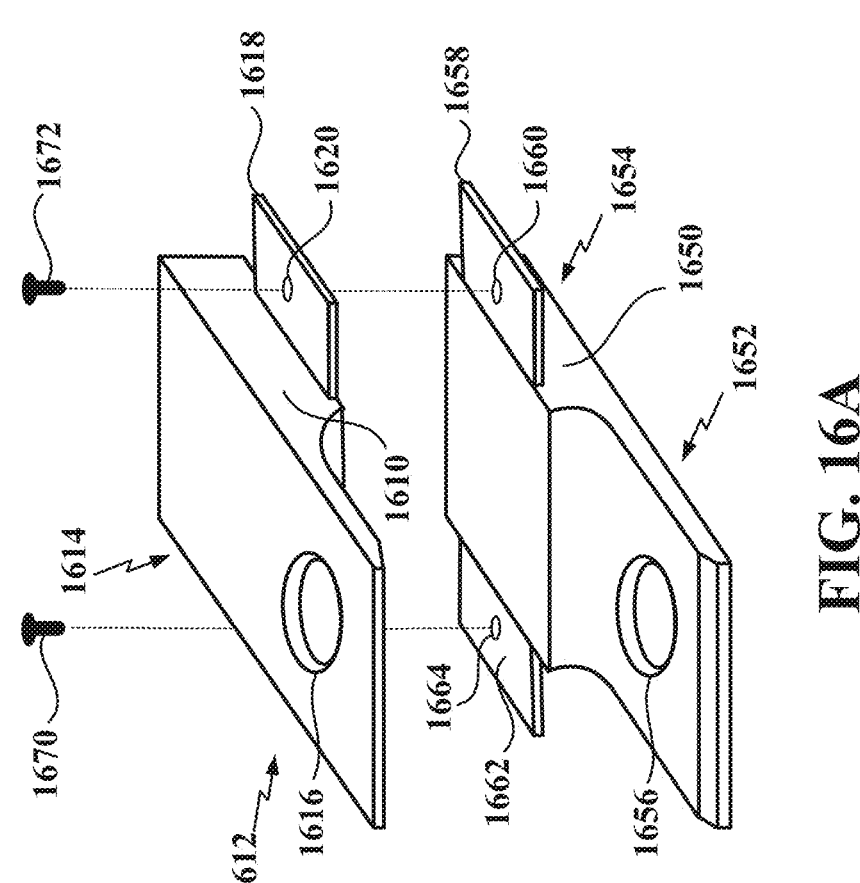

FIGS. 16A and 16B illustrate a rotatable joint member 1600 in accordance with various aspects of the disclosure. As shown in FIG. 16A, the rotatable joint member 1600 may comprise two or more separate components. For example, the rotatable joint member 1600 may include a first component 1610 and a second component 1650. The first component 1610 may include a first socket joint element 1612 and a first base portion 1614. In some examples, the first component 1610 may include a first socket retaining hole 1616 at the first socket joint element 1612. The first component 1610 may further include one or more tabs, such as the tab 1618. The tab 1618 may include a hole 1620. In some examples, the hole 1620 may be threaded.

As further shown in FIG. 16A, the second component 1650 may include a second socket joint element 1652 and a second base portion 1654. In some examples, the second component 1650 may include a second socket retaining hole 1656 at the second socket joint element 1652. The second component 1650 may further include one or more tabs, such as the tabs 1658, 1662. The tab 1658 may include a hole 1660 and the tab 1662 may include a hole 1664. In some examples, the holes 1660, 1664 may be threaded.

The first component 1610 and the second component 1650 may be coupled together to form the rotatable joint member 1600 as shown in FIG. 16B. In some examples, the first and second components 1610, 1650 may be secured together using one or more fasteners 1670, 1672. In some examples, each of the fasteners 1670, 1672 may be implemented as a screw, a press-fit component, or other suitable type of fastener. In one example, the fastener 1672 may be implemented as a screw and may be driven through the hole 1620 of the tab 1618 and the hole 1660 of the tab 1658.

Figure 17B:
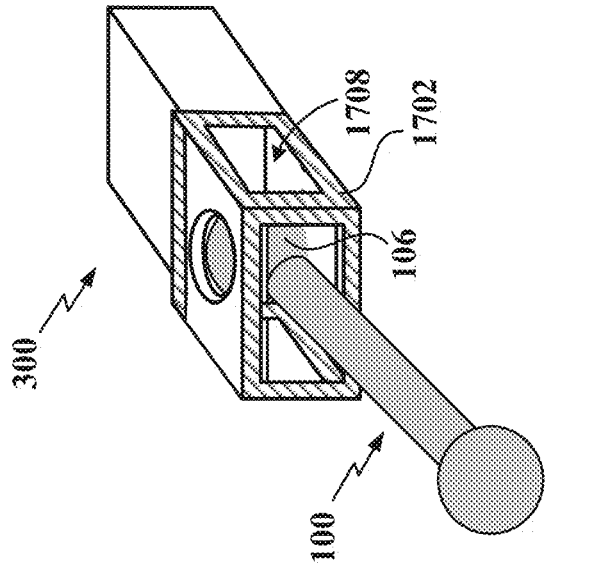
FIGS. 17A and 17B illustrate a socket joint retainer in accordance with various aspects of the disclosure.
Figure 17A:
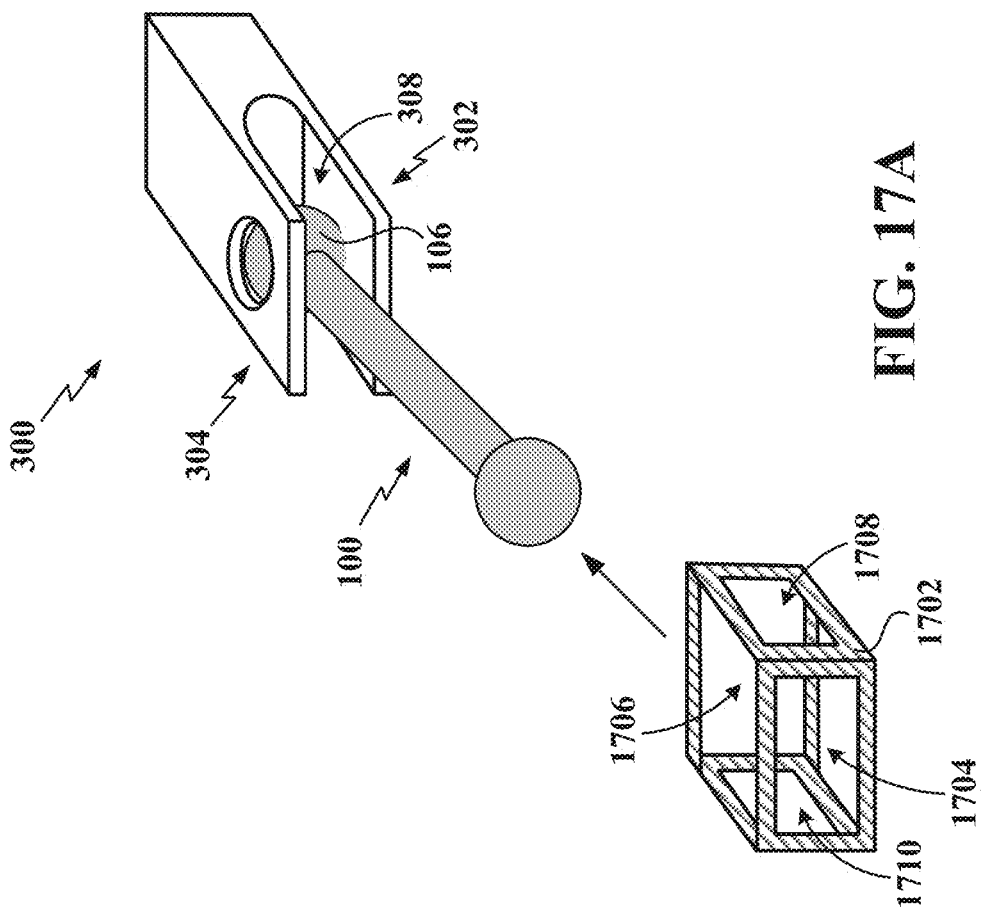

FIGS. 17A and 17B illustrate a socket joint retainer 1702 in accordance with various aspects of the disclosure. The socket joint retainer 1702 may be formed of a rigid material (e.g., metal, plastic, etc.) and may be shaped to fit over the rotatable joint member 300 as shown in FIG. 17B. The socket joint retainer 1702 may ensure that the first and second socket joint elements 302, 304 of the rotatable joint member 300 maintain the second spherical ball 106 of the ball-joint member 100 in the socket cavity 308. For example, the socket joint retainer 1702 may prevent the first and second socket joint elements 302, 304 from deflecting outwards and releasing the second spherical ball 106 from the socket cavity 308 during operation of the rotatable joint member 300 and the ball-joint member 100.

As shown in FIG. 17A, the socket joint retainer 1702 may include a first ball-joint member opening 1704 and a second ball-joint member opening 1706. The first and second ball-joint member openings 1704, 1706 may enable the spherical ball 106 of the ball-joint member 100 to pass through the socket joint retainer 1702.

Figure 18:
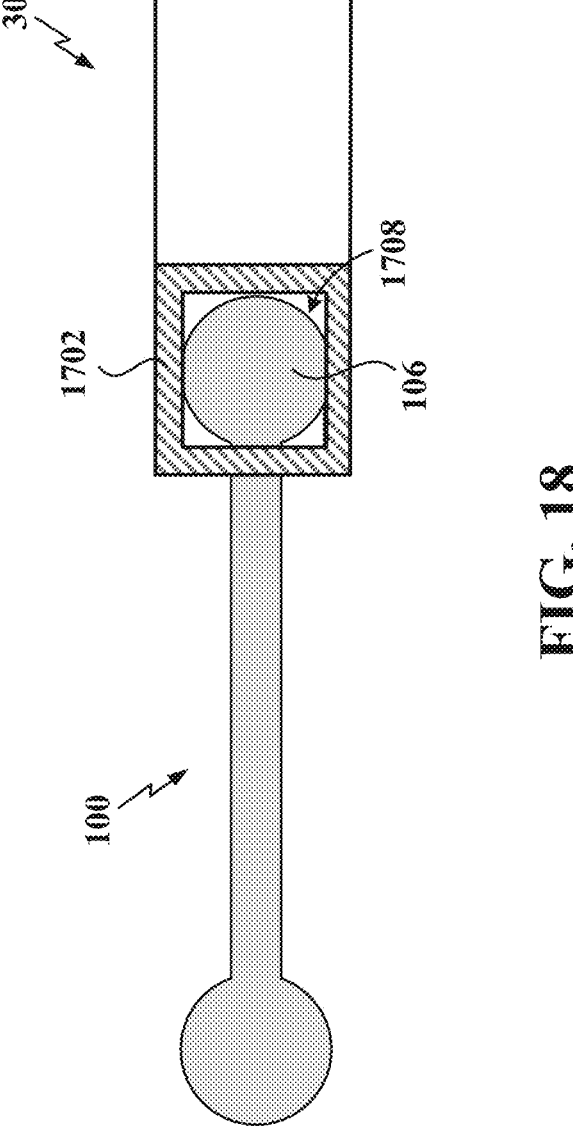
FIG. 18 illustrates a side view of the rotatable joint member in FIG. 17B.

In some aspects of the disclosure, the socket joint retainer 1702 may include first and second side openings 1708, 1710. The first and second side openings 1708, 1710 may provide access to the spherical ball 106 of the ball-joint member 100. A side view of the rotatable joint member 300 in FIG. 17B is shown in FIG. 18.

Figure 19B:
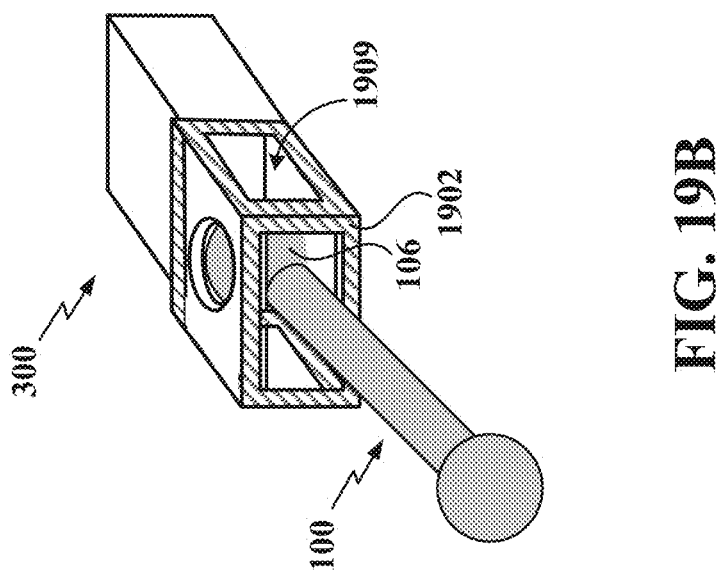
FIGS. 19A and 19B illustrate a socket joint retainer in accordance with various aspects of the disclosure.
Figure 19A:
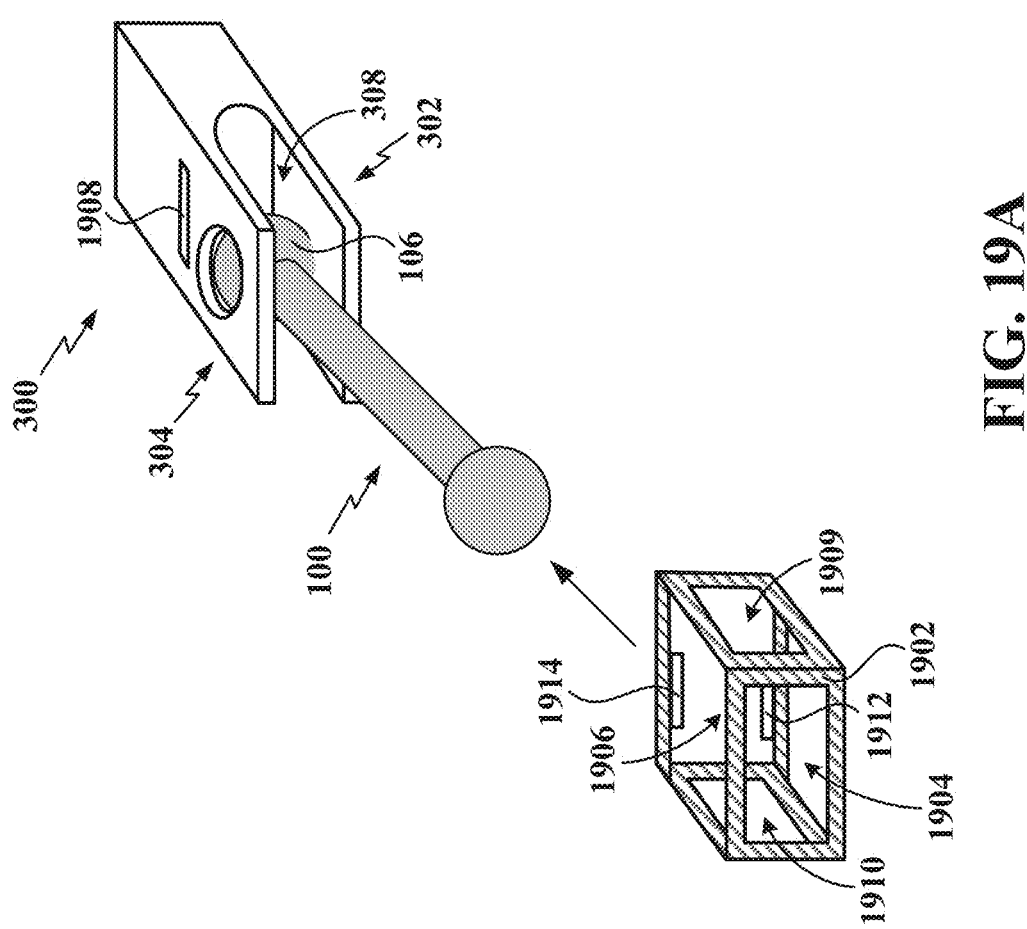

FIGS. 19A and 19B illustrate a socket joint retainer 1902 in accordance with various aspects of the disclosure. The socket joint retainer 1902 may be formed of a rigid material (e.g., metal, plastic, etc.) and may be shaped to fit over the rotatable joint member 300 as shown in FIG. 19B. The socket joint retainer 1902 may ensure that the first and second socket joint elements 302, 304 of the rotatable joint member 300 maintain the second spherical ball 106 of the ball-joint member 100 in the socket cavity 308. For example, the socket joint retainer 1902 may prevent the first and second socket joint elements 302, 304 from deflecting outwards and releasing the second spherical ball 106 from the socket cavity 308 during operation of the rotatable joint member 300 and the ball-joint member 100.

The socket joint retainer 1902 may include a first tab 1912 and a second tab 1914. The first tab 1912 and the second tab 1914 may fit in respective tab openings provided on the rotatable joint member 300. For example, the second tab 1914 may fit in a tab opening 1908 when the socket joint retainer 1902 is installed on the rotatable joint member 300. The first and second tabs 1912, 1914 may prevent the socket joint retainer 1902 from detaching from the rotatable joint member 300 during operation of the rotatable joint member 300 and the ball-joint member 100.

As shown in FIG. 19A, the socket joint retainer 1902 may include a first ball-joint member opening 1904 and a second ball-joint member opening 1906. The first and second ball-joint member openings 1904, 1906 may enable the spherical ball 106 of the ball-joint member 100 to pass through the socket joint retainer 1902.

In some aspects of the disclosure, the socket joint retainer 1902 may include first and second side openings 1909, 1910. The first and second side openings 1909, 1910 may provide access to the spherical ball 106 of the ball-joint member 100.

Figure 20:
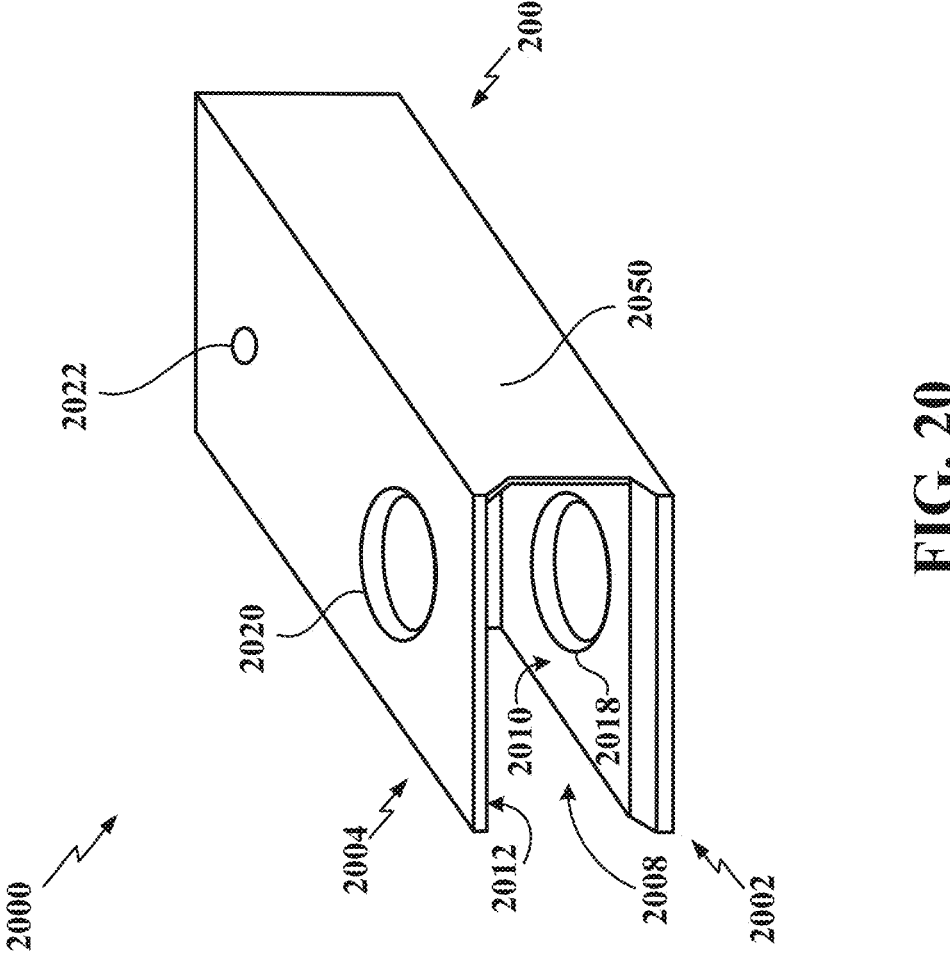
FIG. 20 is a diagram illustrating a rotatable joint member in accordance with various aspects of the disclosure.

FIG. 20 is a diagram illustrating a rotatable joint member 2000 in accordance with various aspects of the disclosure. The rotatable joint member 2000 includes a first socket joint element 2002, a second socket joint element 2004, and a base portion 2006. The first and second socket joint elements 2002, 2004 are situated apart to provide a socket cavity 2008 between the first and second socket joint elements 2002, 2004. For example, an inner surface of the first socket joint element 2002 may define a first cavity wall 2010 and an inner surface of the second socket joint element 2004 may define a second cavity wall 2012.

In some aspects of the disclosure, the first socket joint element 2002 may include a first socket retaining hole 2018 and the second socket joint element 2004 may include a second socket retaining hole 2020. In other aspects of the disclosure, the first socket joint element 2002 may include a first concave region in place of the retaining hole 2018 and/or the second socket joint element 2004 may include a second concave region in place of the second socket retaining hole 2020. In some aspects of the disclosure, the base portion 2006 of the rotatable joint member 2000 may include a hole 2022.

As shown in FIG. 20, the rotatable joint member 2000 includes a socket joint element support wall 2050. In the aspect of FIG. 20, the first and second socket joint elements 2002. 2004 may be coupled to the socket joint element support wall 2050. In other aspects of the disclosure, one of the first and second socket joint elements 2002, 2004 may be coupled to the socket joint element support wall 2050. In some examples, the socket joint element support wall 2050 may increase a rigidity of the first and second socket joint elements 2002, 2004, which may improve the ability of the first and second socket joint elements 2002, 2004 to retain a spherical ball of a ball-joint member (e.g., a spherical ball 106 of the ball-joint member 100).

Figure 21:
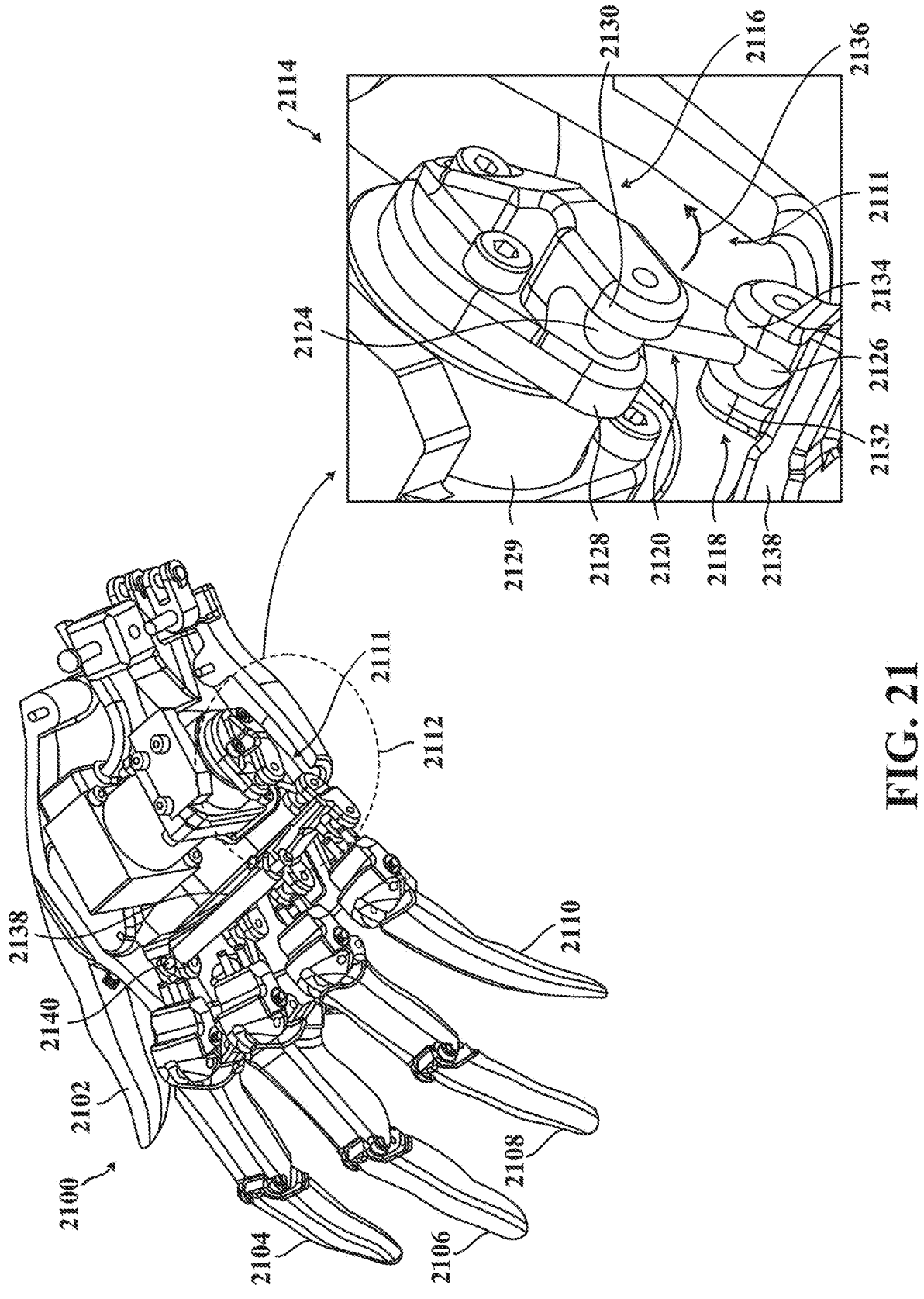
FIG. 21 illustrates an example implementation of an articulated joint in accordance with various aspects of the disclosure.

FIG. 21 illustrates an example implementation of an articulated joint in accordance with various aspects of the disclosure. FIG. 21 includes an articulated hand 2100 including an articulated thumb 2102 and articulated fingers 2104, 2106, 2108, 2110. In some examples, one or more of the articulated fingers 2104, 2106, 2108, 2110 may be controlled using one or more of the articulated joints described herein.

The articulated hand 2100 includes a linkage 2111 of articulated joints. For example, with reference to the detailed view 2114 of a portion 2112 of the articulated hand 2100, the linkage 2111 of articulated joints may include at least a first rotatable joint member 2116 and a second rotatable joint member 2118, where the first rotatable joint member 2116 is coupled to the second rotatable joint member 2118 via a ball-joint member 2120.

As shown in FIG. 21, a first spherical ball 2124 of the ball-joint member 2120 may be moveably secured in a socket cavity between a first socket joint element 2128 and a second socket joint element 2130 of the first rotatable joint member 2116. A second spherical ball 2126 of the ball-joint member 2120 may be moveably secured in a socket cavity between a first socket joint element 2132 and a second socket joint element 2134 of the second rotatable joint member 2118. A rotation of the first rotatable joint member 2116 (e.g., in a direction 2136) may cause a rotation of the second rotatable joint member 2118 via the ball-joint member 2120 in accordance with the principles described with reference to the linkage 800 of articulated joints in FIGS. 8A and 8B.

In some examples, the first rotatable joint member 2116 may be coupled to an actuator 2129 (e.g., a motor) configured to rotate the first rotatable joint member 2116. For example, the actuator 2129 and the first rotatable joint member 2116 may serve as a crank system for delivering a force (e.g., a push or a pull) to the ball-joint member 2120.

In some examples, the rotation of the second rotatable joint member 2118 may control movement of one or more of the articulated fingers 2104, 2106, 2108, 2110. For example, the second rotatable joint member 2118 may include a base portion 2138 configured to rotate about a rod 2140. The base portion 2138 may be coupled to one or more of the articulated fingers 2104, 2106, 2108, 2110 and may function as a load transfer bar to control movement of one or more of the articulated fingers 2104, 2106, 2108, 2110 based on a rotation about the rod 2140. Therefore, a rotation of the first rotatable joint member 2116 (e.g., in the direction 2136 or in an opposite direction) may cause a rotation of the second rotatable joint member 2118 about the rod 2140. The rotation of the second rotatable joint member 2118 about the rod 2140 may cause a movement of one or more of the fingers 2104, 2106, 2108, 2110.

Figure 22:
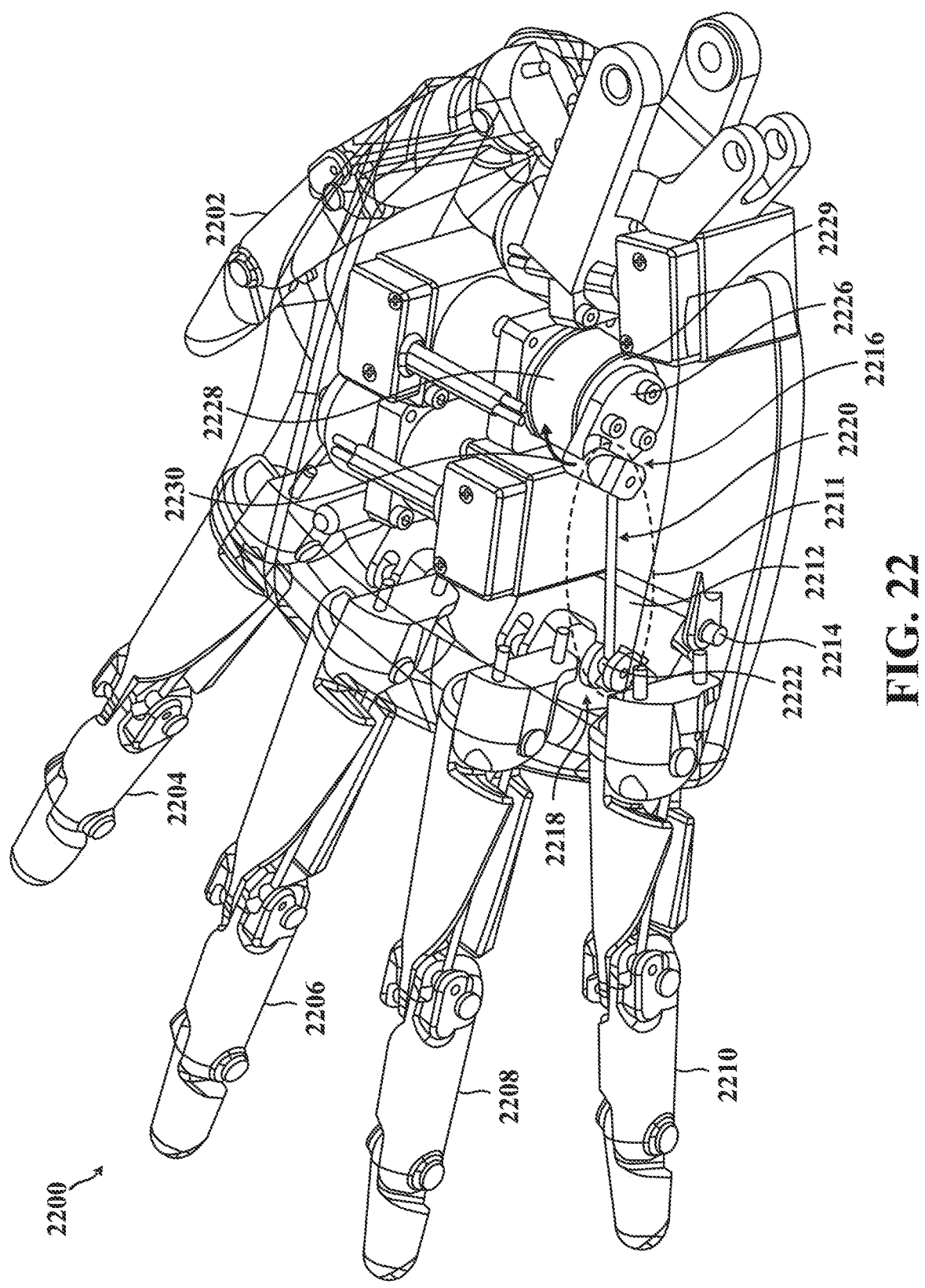
FIG. 22 illustrates an example implementation of articulated joints in accordance with various aspects of the disclosure.

FIG. 22 illustrates an example implementation of articulated joints in accordance with various aspects of the disclosure. FIG. 22 includes an articulated hand 2200 including an articulated thumb 2202 and articulated fingers 2204, 2206, 2208, 2210. One or more of the articulated fingers 2204, 2206, 2208, 2210 may be controlled using a linkage 2211 of articulated joints. For example, the linkage 2211 of articulated joints may include at least a first rotatable joint member 2216 and a second rotatable joint member 2218, where the first rotatable joint member 2216 is coupled to the second rotatable joint member 2218 via a ball-joint member 2220.

A first spherical ball of the ball-joint member 2220 may be moveably secured in a socket cavity of the first rotatable joint member 2216. A second spherical ball 2222 of the ball-joint member 2220 may be moveably secured in a socket cavity of the second rotatable joint member 2218. A rotation of the first rotatable joint member 2216 (e.g., in a direction 2230) may cause a rotation of the second rotatable joint member 2218 via the ball-joint member 2220 in accordance with the principles described with reference to the linkage 800 in FIGS. 8A and 8B.

It should be understood that the linkage 2211 of articulated joints may include two articulated joints as described herein. For example, the first rotatable joint member 2216 coupled to the ball-joint member 2220 may be considered a first articulated joint and the second rotatable joint member 2218 coupled to the ball-joint member 2220 may be considered a second articulated joint.

In some examples, the first rotatable joint member 2216 may be coupled to an actuator 2228 (e.g., a motor) configured to rotate the first rotatable joint member 2216. For example, the first rotatable joint member 2216 may include a base portion 2226 coupled to a rotating element 2229 of the actuator 2228.

In some examples, the rotation of the second rotatable joint member 2218 may control movement of one or more of the articulated fingers 2206, 2208, 2210. For example, the second rotatable joint member 2218 may include a base portion 2212, where a rod 2214 extends through the base portion 2212. The second rotatable joint member 2218 may rotate about the rod 2214. The base portion 2212 may be coupled to one or more of the articulated fingers 2206, 2208, 2210 via respective ball-joint members and may cause movement of one or more of the articulated fingers 2206, 2208, 2210 in response to a rotation about the rod 2214. Therefore, a rotation of the first rotatable joint member 2216 (e.g., in the direction 2230 or in an opposite direction) may cause a rotation of the second rotatable joint member 2218 about the rod 2214. The rotation of the second rotatable joint member 2218 about the rod 2214 may cause a movement of one or more of the articulated fingers 2206, 2208, 2210. This is illustrated in FIG. 23.

Figure 23:
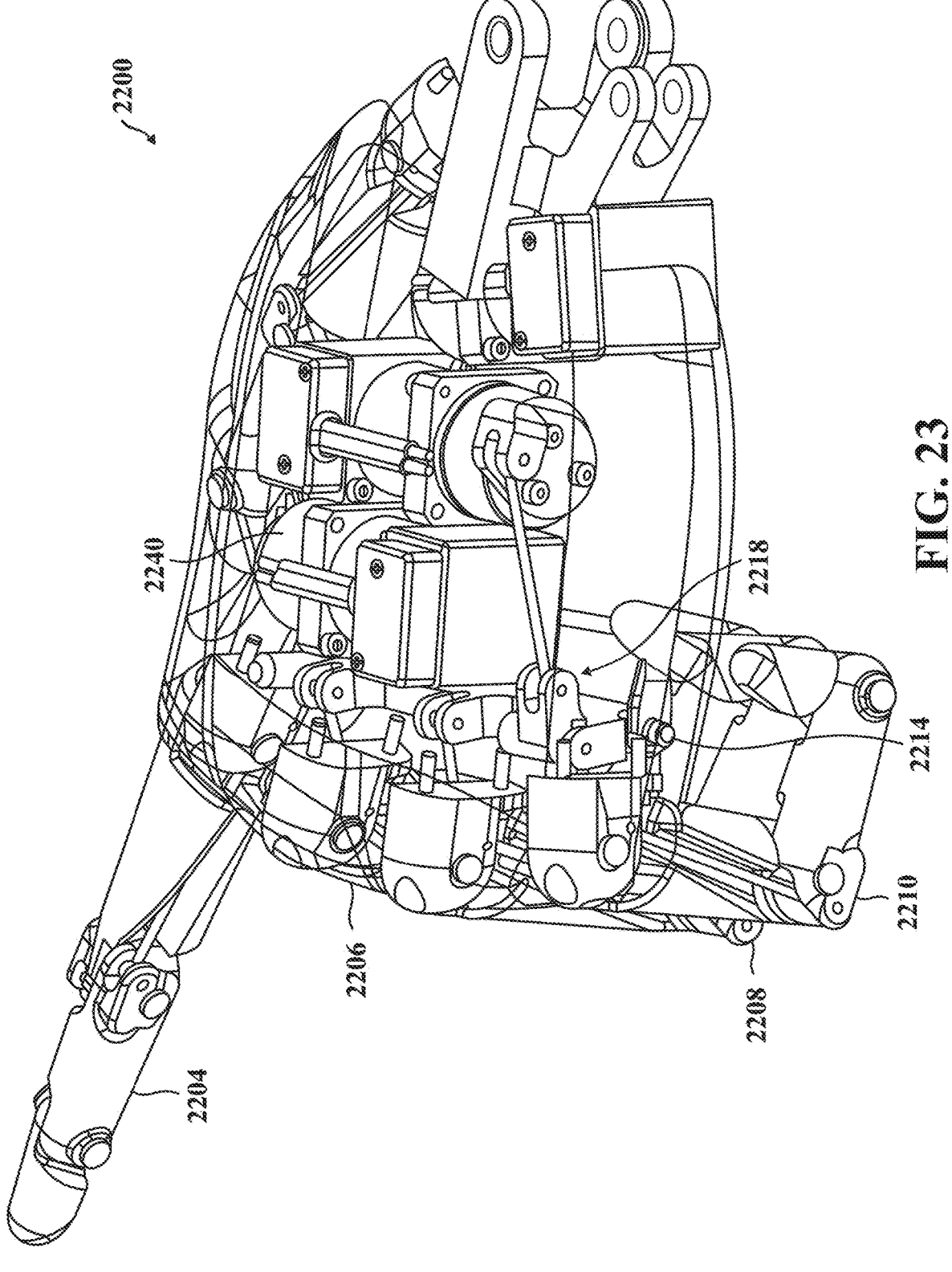
FIG. 23 illustrates an articulated hand after a second rotatable joint member has been rotated about the rod through its full range of motion.

FIG. 23 illustrates the articulated hand 2200 after the second rotatable joint member 2218 has been rotated about the roc 2214 through its full range of motion. As shown in the configuration of FIG. 23, the rotation of the second rotatable joint member 2218 through its full range of motion may cause one or more of the articulated fingers 2206, 2208, 2210 to move into a curled position. In some aspects, at least one articulated finger (e.g., the articulated finger 2204) may be controlled using a linkage of articulated joints and an actuator 2240 (e.g., motor) independent from the linkage 2211 of articulated joints and the actuator 2228 described with reference to FIG. 22. For example, this may allow independent control of the articulated finger 2204 from the articulated fingers 2206, 2208, 2210, thereby enabling the articulated hand 2200 to achieve different finger configurations (e.g., a finger pointing configuration as shown in FIG. 23, a closed fist configuration, and/or other possible finger configurations).

Figure 24:
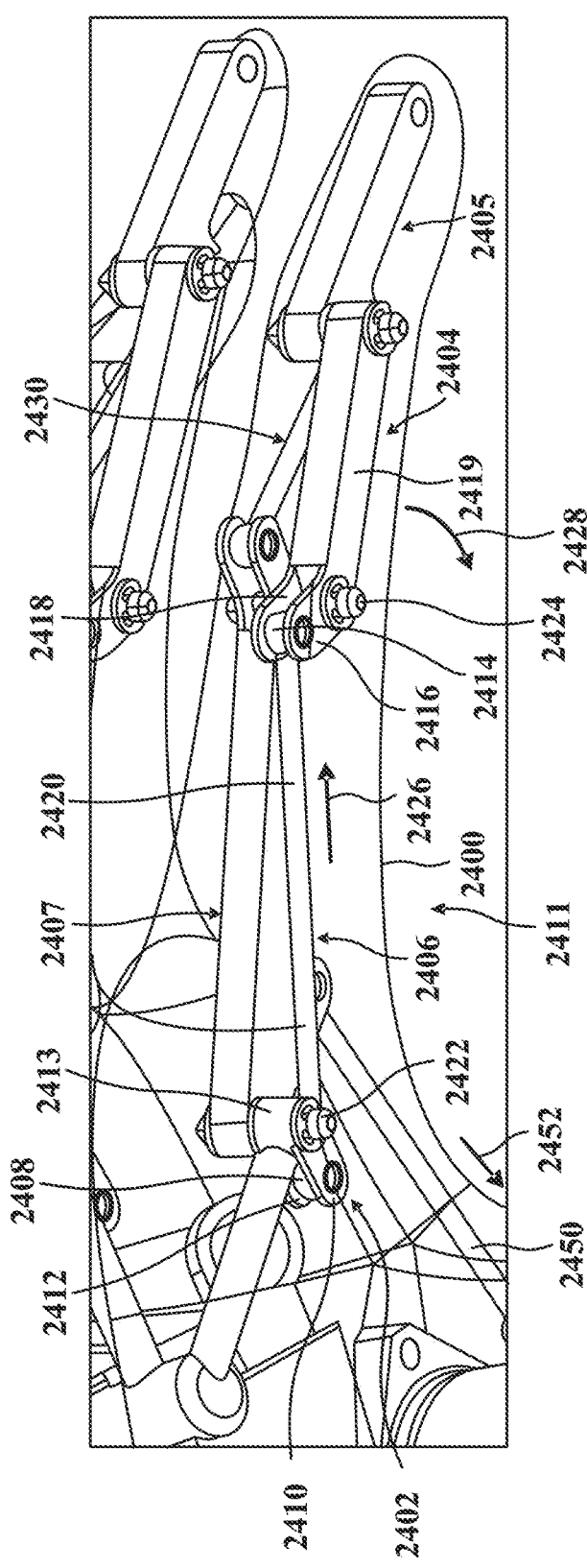
FIG. 24 illustrates an articulated finger in accordance with various aspects of the disclosure.

FIG. 24 illustrates an articulated finger 2400 in accordance with various aspects of the disclosure. The articulated finger 2400 in FIG. 24 may include at least one linkage of articulated joints for controlling movement of the articulated finger 2400. For example, the articulated finger 2400 may include a linkage 2411 of articulated joints including a first rotatable joint member 2402, a second rotatable joint member 2404, and a ball-joint member 2406. The first rotatable joint member 2402 may include a first socket joint element 2410, a second socket joint element 2412, and a base portion 2413. The second rotatable joint member 2404 may include a first socket joint element 2416, a second socket joint element 2418, and a base portion 2419. The ball-joint member 2406 may include a rod 2420, a first spherical ball 2408 coupled to a first end of the rod 2420, and a second spherical ball 2414 coupled to a second end of the rod 2420. The first rotatable joint member 2402 may be a fixed rotatable joint member and may not rotate about a rod 2422 inserted through the base portion 2413, and the second rotatable joint member 2404 may rotate about a rod 2424 inserted through the base portion 2419.

The first spherical ball 2408 of the ball-joint member 2406 may be moveably secured in a socket cavity between the first socket joint element 2410 and the second socket joint element 2412 of the first rotatable joint member 2402. The second spherical ball 2414 of the ball-joint member 2406 may be moveably secured in a socket cavity between the first socket joint element 2416 and the second socket joint element 2418 of the second rotatable joint member 2404.

A ball-joint member 2450 may be coupled to a third rotational joint member 2407. The ball-joint member 2450 may be moved in a first direction 2452 to rotate the third rotational joint member 2407 about the rod 2422. The rotation of the third rotatable joint member 2407 may cause a rotation of the second rotatable joint member 2404 (e.g., in a direction 2428) via the ball-joint member 2406 in accordance with the principles described with reference to the linkage 800 in FIGS. 8A and 8B. For example, the rod 2420 may transfer a force in a direction 2426 to rotate the second rotatable joint member 2404. In some examples, the ball-joint member 2450 may be coupled to an actuator configured to move the ball-joint member 2450 in the first direction 2452.

For example, the rotation of the second rotatable joint member 2404 may simulate a natural bending of a finger (e.g., the articulated finger 2400) at a joint of the finger. As shown in FIG. 24, multiple linkages of articulated joints (e.g., the linkage including third rotational joint member 2407, a fourth rotational joint member 2405, and a corresponding ball-joint member 2430) to achieve additional degrees of freedom for the articulated finger 2400.

Figure 25:
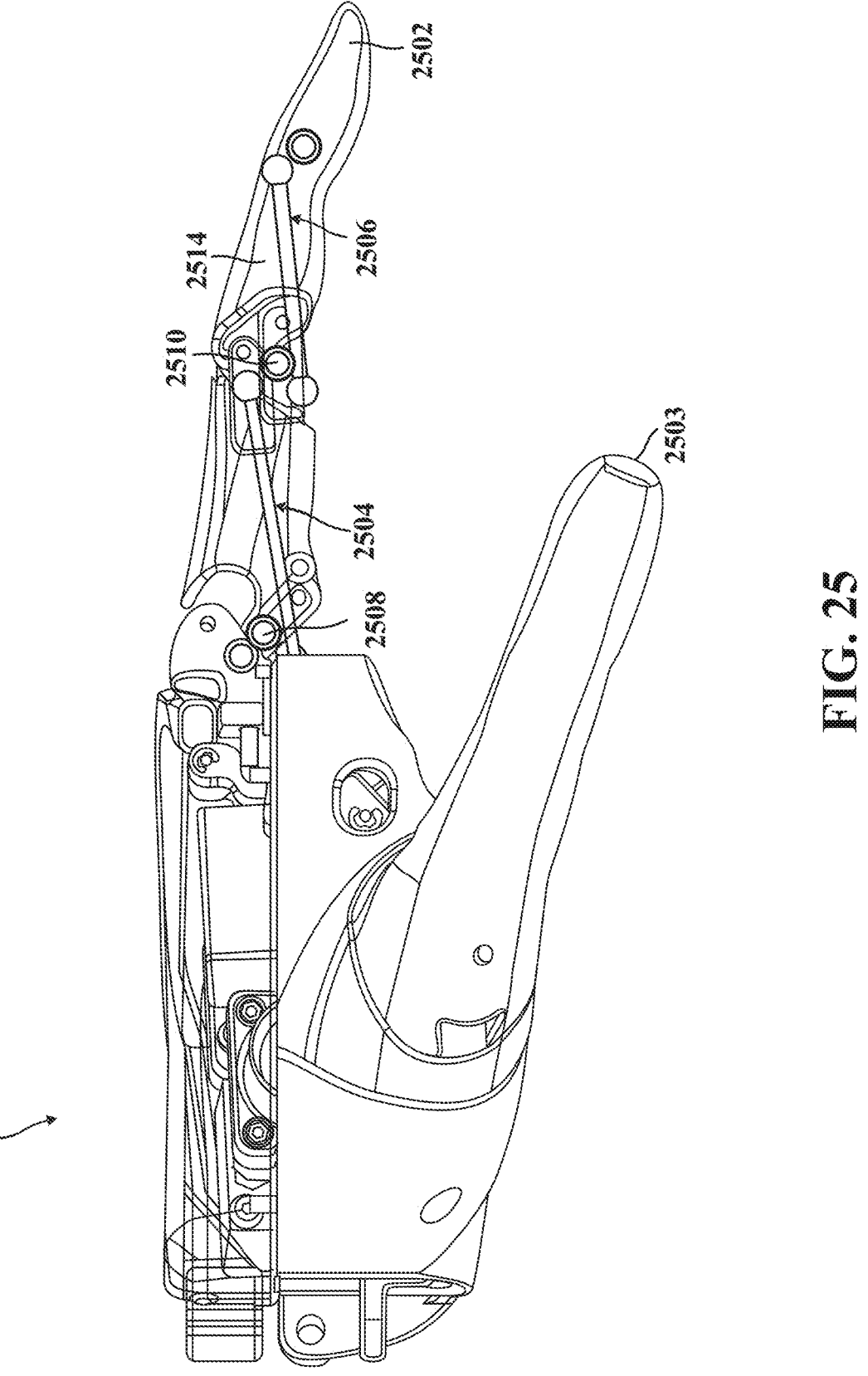
FIG. 25 illustrates an example configuration of ball-joint members in an articulated hand in accordance with various aspects of the disclosure.

FIG. 25 illustrates an example configuration of ball-joint members in an articulated hand in accordance with various aspects of the disclosure. FIG. 25 includes a first side-view of an articulated hand 2500, which shows an articulated finger 2502 and a thumb 2503 of the articulated hand 2500. The articulated finger 2502 includes a first ball-joint member 2504 and a second ball-joint member 2506. The first ball-joint member 2504 may raise or lower the articulated finger 2502 at a first joint 2508, and the second ball-joint member 2506 may cause a portion 2514 of the articulated finger 2502 to bend at a second joint 2510. The first and second ball-joint members 2504, 2506 may be coupled to rotatable joint members (not shown in FIG. 25 for ease of illustration), such as the first and second rotatable joint members 300_1, 300_2 described with reference to FIGS. 8A and 8B.

Figure 26:
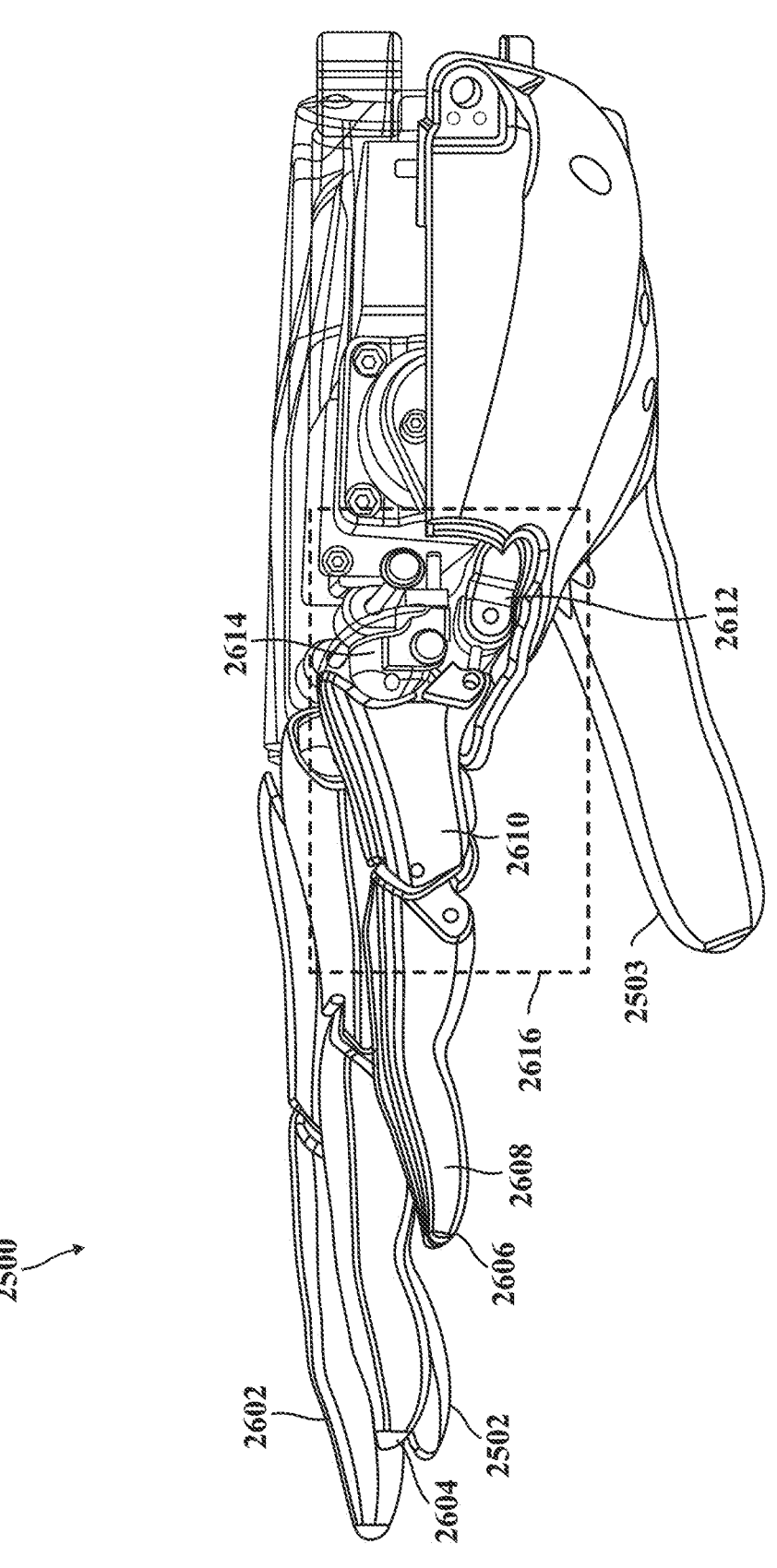
FIG. 26 includes a second side-view of an articulated hand, which shows the articulated fingers and the thumb of the articulated hand in accordance with various aspects of the disclosure.

FIG. 26 includes a second side-view of the articulated hand 2500, which shows the articulated fingers 2502, 2602, 2604, 2606 and the thumb 2503 of the articulated hand 2500 in accordance with various aspects of the disclosure. In the aspect shown in FIG. 26, the ball-joint members and other structures included in the articulated fingers 2502, 2602, 2604, 2606 are covered with shell components, such as first shell component 2608 and second shell component 2610, to simulate the appearance of anatomically correct human fingers. As described herein, the articulated joints described herein enable controlled movement of the articulated fingers of the articulated had 2500 while maintaining realistic proportions of a human hand and/or fingers.

Figure 27:
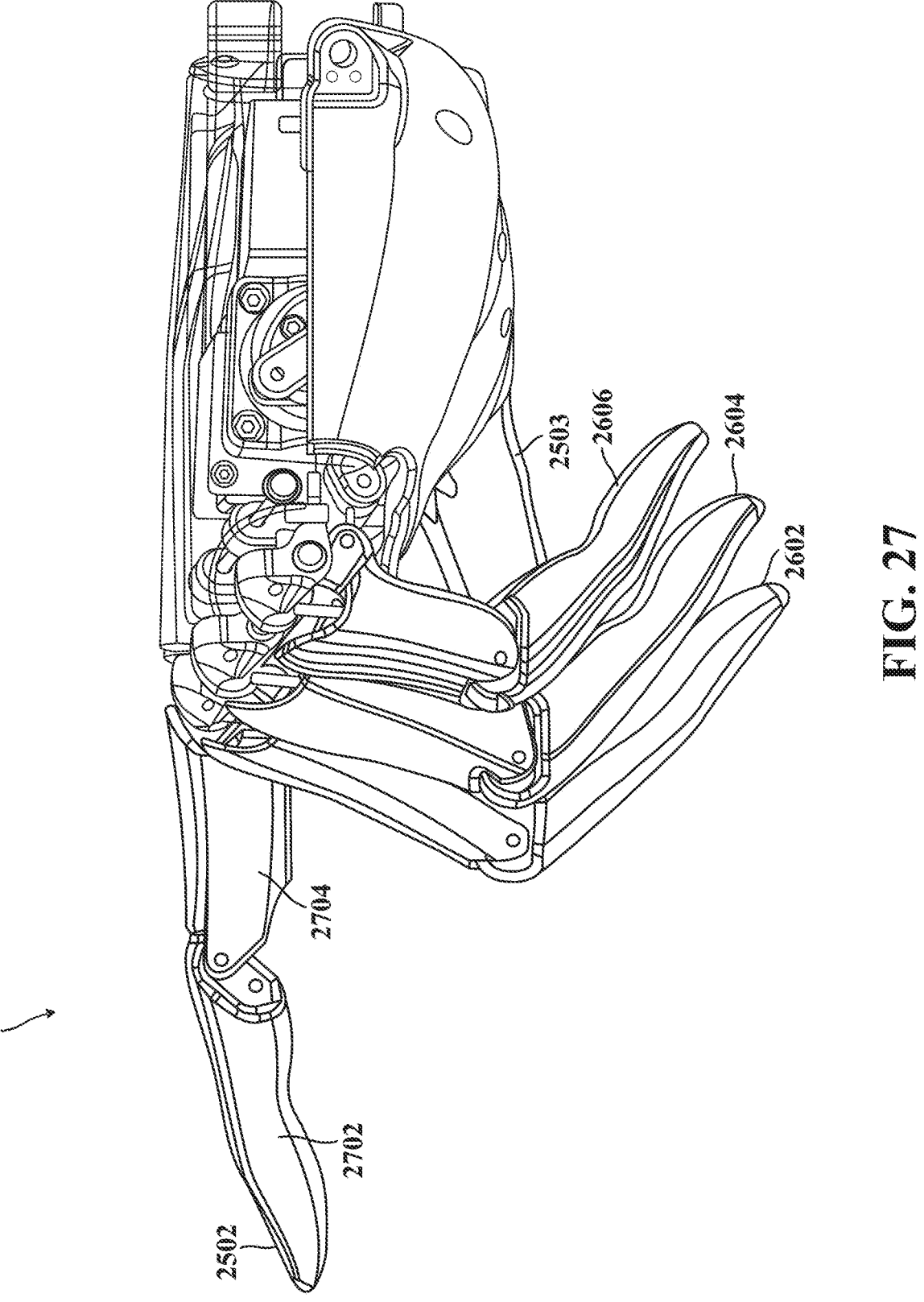
FIG. 27 includes the second side-view of the articulated hand, which shows the articulated fingers of the articulated hand after the articulated fingers have moved to a curled position.

FIG. 27 includes the second side-view of the articulated hand 2500, which shows the articulated fingers 2602, 2604, 2606 of the articulated hand 2500 after the articulated fingers 2602, 2604, 2606 have moved to a curled position. For example, the articulated fingers 2602, 2604, 2606 may be moved to the curled position by lowering and bending each of the articulated fingers 2602, 2604, 2606 as described herein with reference to FIGS. 28 and 29.

Figure 28:
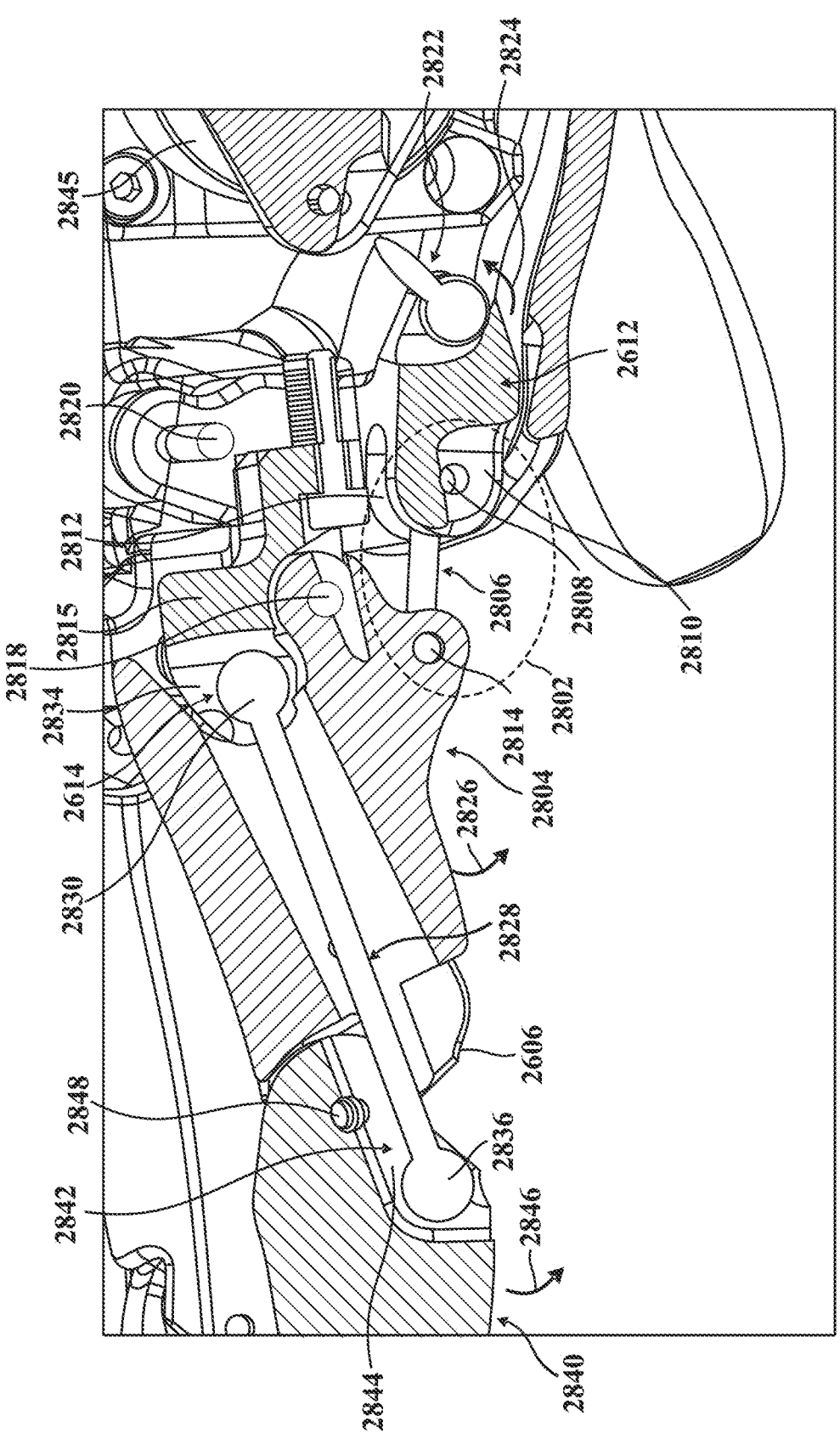
FIG. 28 illustrates a cross-sectional view of the articulated finger of the articulated hand shown in FIG. 26 in accordance with various aspects of the disclosure.

FIG. 28 illustrates a cross-sectional view of the articulated finger 2606 of the articulated hand 2500 shown in FIG. 26 at the portion 2616 in accordance with various aspects of the disclosure. The articulated hand 2500 includes a linkage 2802 of articulated joints. For example, the linkage 2802 of articulated joints may include at least a first rotatable joint member 2612 and a second rotatable joint member 2804, where the first rotatable joint member 2612 is coupled to the second rotatable joint member 2804 via a ball-joint member 2806. A first spherical ball 2808 of the ball-joint member 2806 may be moveably secured in a socket cavity between a first socket joint element 2810 and a second socket joint element 2812 of the first rotatable joint member 2612. A second spherical ball 2814 of the ball-joint member 2806 may be moveably secured in a socket cavity of the second rotatable joint member 2804. The articulated finger 2606 may be raised and lowered using the linkage 2802 of rotatable joint members.

For example, a rotation of the first rotatable joint member 2612 (e.g., about a rod 2820 in a direction 2824) may cause a rotation of the second rotatable joint member 2804 via the ball-joint member 2806 in accordance with the principles described with reference to the linkage 800 of articulated joints in FIGS. 8A and 8B. For example, the second rotatable joint member 2804 may rotate about a rod 2818. In some examples, the first rotatable joint member 2612 may be coupled to an actuator 2845 (e.g., a motor) via a ball-joint member 2822, where the actuator 2845 is configured to rotate the first rotatable joint member 2612 about the rod 2820.

As shown in FIG. 28, the articulated hand 2500 may include a fixed joint member 2815 configured to moveably secure a first spherical ball 2830 of a ball-joint member 2828. For example, the first spherical ball 2830 may be moveably secured in a socket cavity 2614 formed between a first socket joint element 2834 and a second socket joint element (not shown in the cross-section view of FIG. 28) of the fixed joint member 2815.

A second spherical ball 2836 of the ball-joint member 2828 may be moveably secured in a socket cavity 2842 of a third rotatable joint member 2840. For example, the second socket cavity 2842 may be formed between a first socket joint element 2844 and a second socket joint element (not shown in the cross-section view of FIG. 28) of the third rotatable joint member 2840. It should be noted that the third rotatable joint member 2840 and the ball-joint member 2828 may form an articulated joint in accordance with the aspects described herein.

A downward movement of the second rotatable joint member 2804 (e.g., a rotation about the rod 2818 in a downward direction 2826) may also cause a downward movement of the third rotatable joint member 2840 and the ball-joint member 2828. Since the first spherical ball 2830 of the ball-joint member 2828 is moveably secured in the socket cavity 2614 of the fixed joint member 2815, the ball-joint member 2828 may pull on the third rotatable joint member 2840 as the second rotatable joint member 2804 rotates about the rod 2818 in the downward direction 2826 and may cause the third rotatable joint member 2840 to rotate about a rod 2848 in a downward direction 2846. Therefore, in one example, the third rotatable joint member 2840 may rotate about the rod 2848 in the downward direction 2846 as the second rotatable joint member 2804 rotates about the rod 2818 in the downward direction 2826. In another example, the third rotatable joint member 2840 may rotate about the rod 2848 in an upward direction as the second rotatable joint member 2804 rotates about the rod 2818 in an upward direction.

Figure 29:
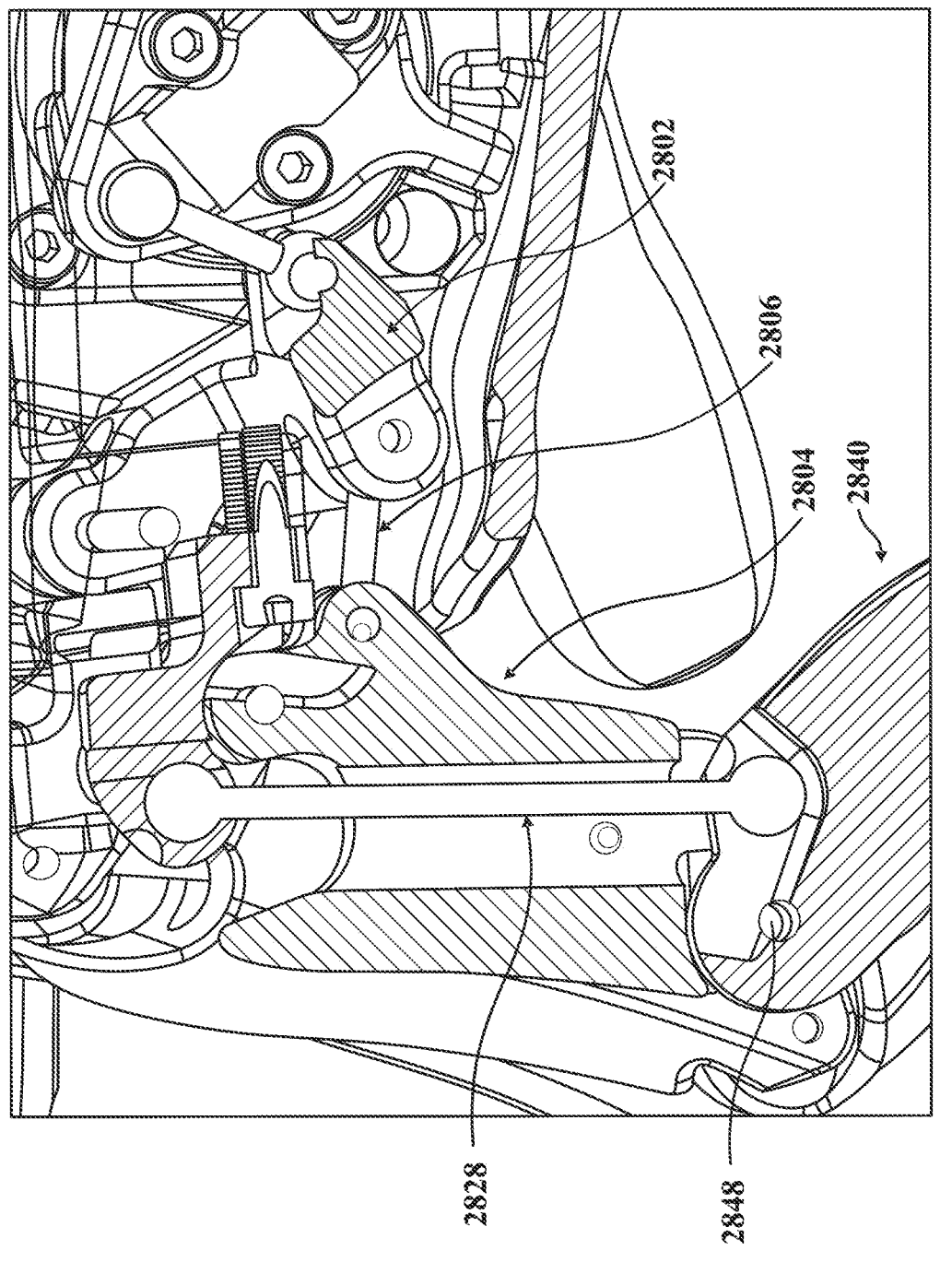
FIG. 29 includes the cross-sectional view of the articulated finger shown in FIG. 28 after the articulated finger has moved down and bent at the rod.

Therefore, in some examples, a rotation of the second rotatable joint member 2804 about the rod 2818 in the downward direction 2826 may cause the articulated finger 2606 to bend at the rod 2848. This is illustrated in FIG. 29. FIG. 29 includes the cross-sectional view of the articulated finger 2606 shown in FIG. 28 after the articulated finger 2606 has moved down and bent at the rod 2848.

Figure 30:
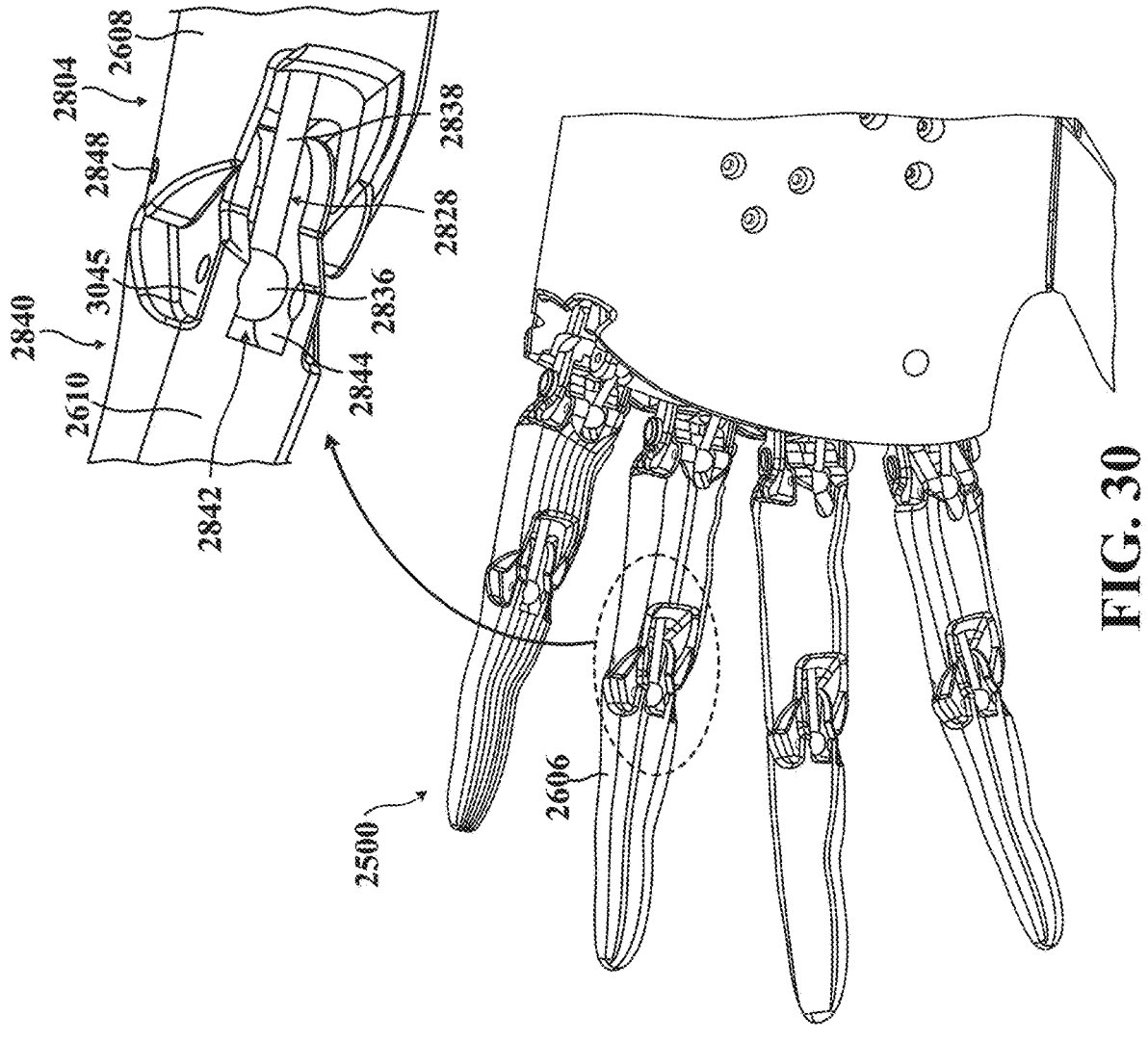
FIG. 30 illustrates a bottom view of the articulated hand including multiple articulated joints in accordance with various aspects of the disclosure.

FIG. 30 illustrates a bottom view of the articulated hand 2500 including multiple articulated joints in accordance with various aspects of the disclosure. As shown in the detailed view of the articulated finger 2606, the second spherical ball 2836 of the ball-joint member 2828 may be moveably secured in a socket cavity 2842 of the third rotatable joint member 2840. For example, the second socket cavity 2842 may be formed between the first socket joint element 2844 and a second socket joint element 3045 of the third rotatable joint member 2840.

Figure 31:
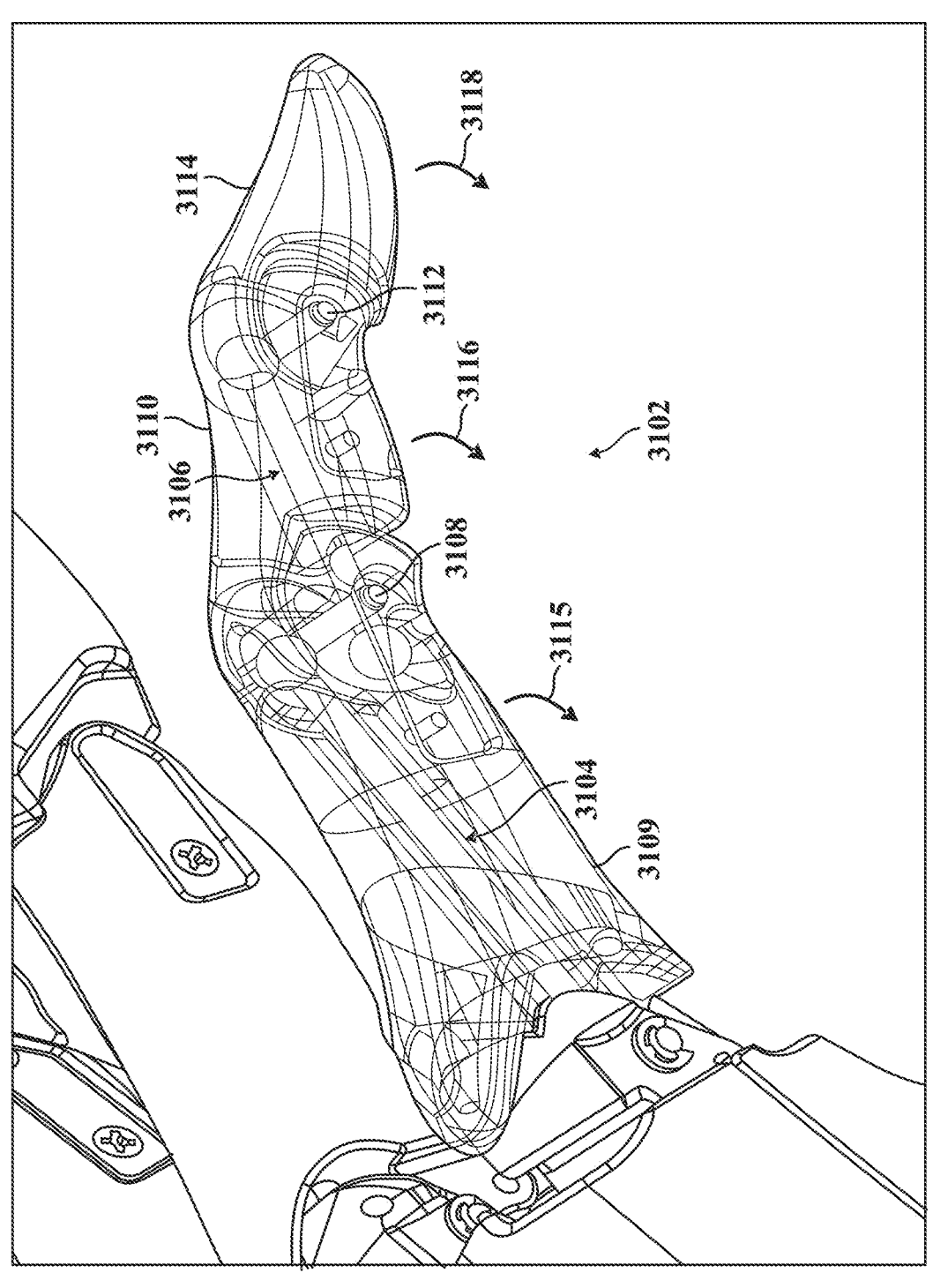
FIG. 31 illustrates a configuration of ball-joint members in an articulated finger in accordance with various aspects of the disclosure.

FIG. 31 illustrates a configuration of ball-joint members in an articulated finger 3102 in accordance with various aspects of the disclosure. As shown in FIG. 31, the articulated finger 3102 in FIG. 31 may include a first moveable portion 3109, a second moveable portion 3110, and a third moveable portion 3114. A first ball joint member 3104 may be situated in the first moveable portion 3109 and a second ball-joint member 3106 may be situated in the second moveable portion 3110. In some examples, the first ball-joint member 3104 may enable raising and lowering of the articulated finger 3102. For example, the first ball-joint member 3104 may be lowered in a first direction 3115 to lower the first, second, and third moveable portions 3109, 3110, 3114 of the articulated finger 3102.

In the configuration of FIG. 31, the first ball-joint member 3104 may cause the second moveable portion 3110 of the articulated finger 3102 to rotate about a rod 3108 in a second direction 3116 as the first ball-joint member 3104 is lowered in the first direction 3115. The second ball-joint member 3106 may cause the third moveable portion 3114 to rotate about a rod 3112 in a third direction 3118 as the second ball-joint member 3106 is lowered in the second direction 3116.

It should be noted that the configuration of first and second ball-joint members 3104, 3106 allows three degrees of freedom in the articulated finger 3102. Therefore, in some examples, the lowering of the articulated finger 3102 and the rotation of the second and third portions 3110, 3114 may simulate a natural curling motion of a human finger.

Figure 32:
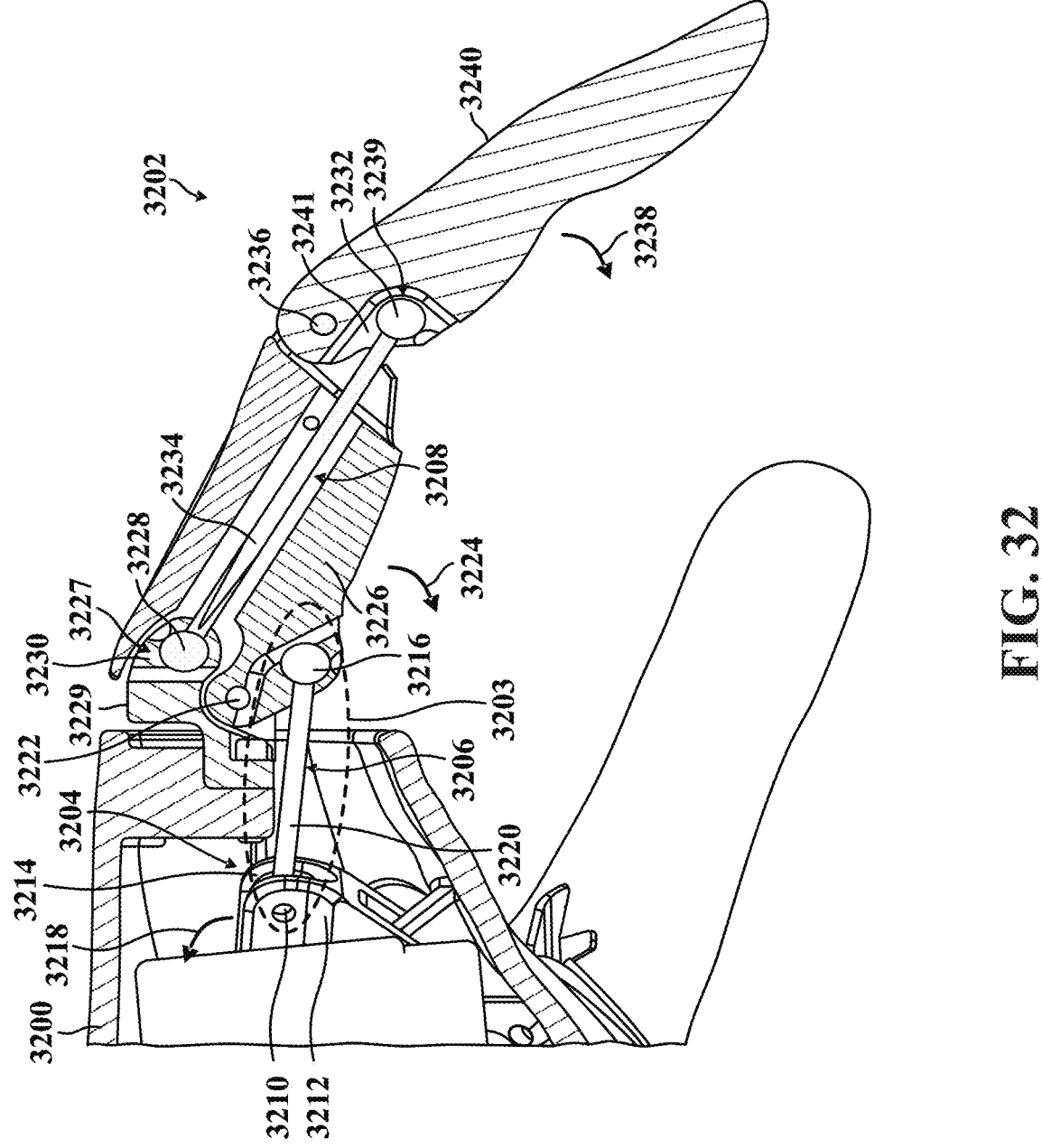
FIG. 32 illustrates a cross-sectional view of an articulated finger in accordance with various aspects of the disclosure.

FIG. 32 illustrates a cross-sectional view of an articulated finger 3202 in accordance with various aspects of the disclosure. In some examples, the articulated finger 3202 may be implemented in an articulated hand 3200 (partially shown for ease of illustration).

The articulated finger 3202 may be raised and lowered using a linkage 3203 of articulated joints in accordance with the aspects described herein. For example, the linkage 3203 of articulated joints may include at least a first rotatable joint member 3204 and a second rotatable joint member 3226, where the first rotatable joint member 3204 is coupled to the second rotatable joint member 3226 via a ball-joint member 3206. The ball-joint member 3206 includes a rod 3220, a first spherical ball 3210, and a second spherical ball 3216.

The first spherical ball 3210 of the ball-joint member 3206 may be moveably secured in a socket cavity between a first socket joint element 3212 and a second socket joint element 3214 of the first rotatable joint member 3204. The second spherical ball 3216 of the ball-joint member 3206 may be moveably secured in a socket cavity of the second rotatable joint member 3226. The articulated finger 3202 may be raised and lowered using the linkage 3203 of articulated joints.

A rotation of the first rotatable joint member 3204 (e.g., in a direction 3218) may cause a rotation of the second rotatable joint member 3226 via the first ball-joint member 3206 in accordance with the principles described with reference to the linkage 800 in FIGS. 8A and 8B. For example, the second rotatable joint member 3226 may rotate about a rod 3222. In some examples, the first rotatable joint member 3204 may be coupled to an actuator, such as a motor, where the actuator is configured to rotate the first rotatable joint member 3204.

As shown in FIG. 32, the articulated hand 3200 may include a fixed joint member 3229 configured to moveably secure a first spherical ball 3228 of a second ball-joint member 3208. The second ball-joint member 3208 includes a rod 3234, the first spherical ball 3228, and a second spherical ball 3232. For example, the first spherical ball 3228 may be moveably secured in a socket cavity 3227 formed between a first socket joint element 3230 and a second socket joint element (not shown in the cross-section view of FIG. 32) of the fixed joint member 3229.

The second spherical ball 3232 of the second ball-joint member 3208 may be moveably secured in a socket cavity 3239 of a third rotatable joint member 3240. For example, the second socket cavity 3239 may be formed between a first socket joint element 3241 and a second socket joint element (not shown in the cross-section view of FIG. 28) of the third rotatable joint member 3240. It should be noted that the third rotatable joint member 3240 and the second ball joint member 3208 may form an articulated joint in accordance with the aspects described herein.

A downward movement of the second rotatable joint member 3226 (e.g., a rotation about the rod 3222 in a downward direction 3224) may also cause a downward movement of the third rotatable joint member 3240 and the second ball-joint member 3208. Since the first spherical ball 3228 of the second ball-joint member 3208 is moveably secured in the socket cavity 3227 of the fixed joint member 3229, the second ball-joint member 3208 may pull on the third rotatable joint member 3240 as the second rotatable joint member 3226 rotates about the rod 3222 in the downward direction 3224 and may cause the third rotatable joint member 3240 to rotate about a rod 3236 in a downward direction 3238. Therefore, in one example, the third rotatable joint member 3240 may rotate about the rod 3236 in the downward direction 3238 as the second rotatable joint member 3226 rotates about the rod 3222 in the downward direction 3224. In another example, the third rotatable joint member 3240 may rotate about the rod 3236 in an upward direction as the second rotatable joint member 3226 rotates about the rod 3222 in an upward direction. Therefore, in some examples, a rotation of the second rotatable joint member 3226 about the rod 3222 in the downward direction 3224 may cause the articulated finger 3202 to bend at the rod 3236.

Figure 33:
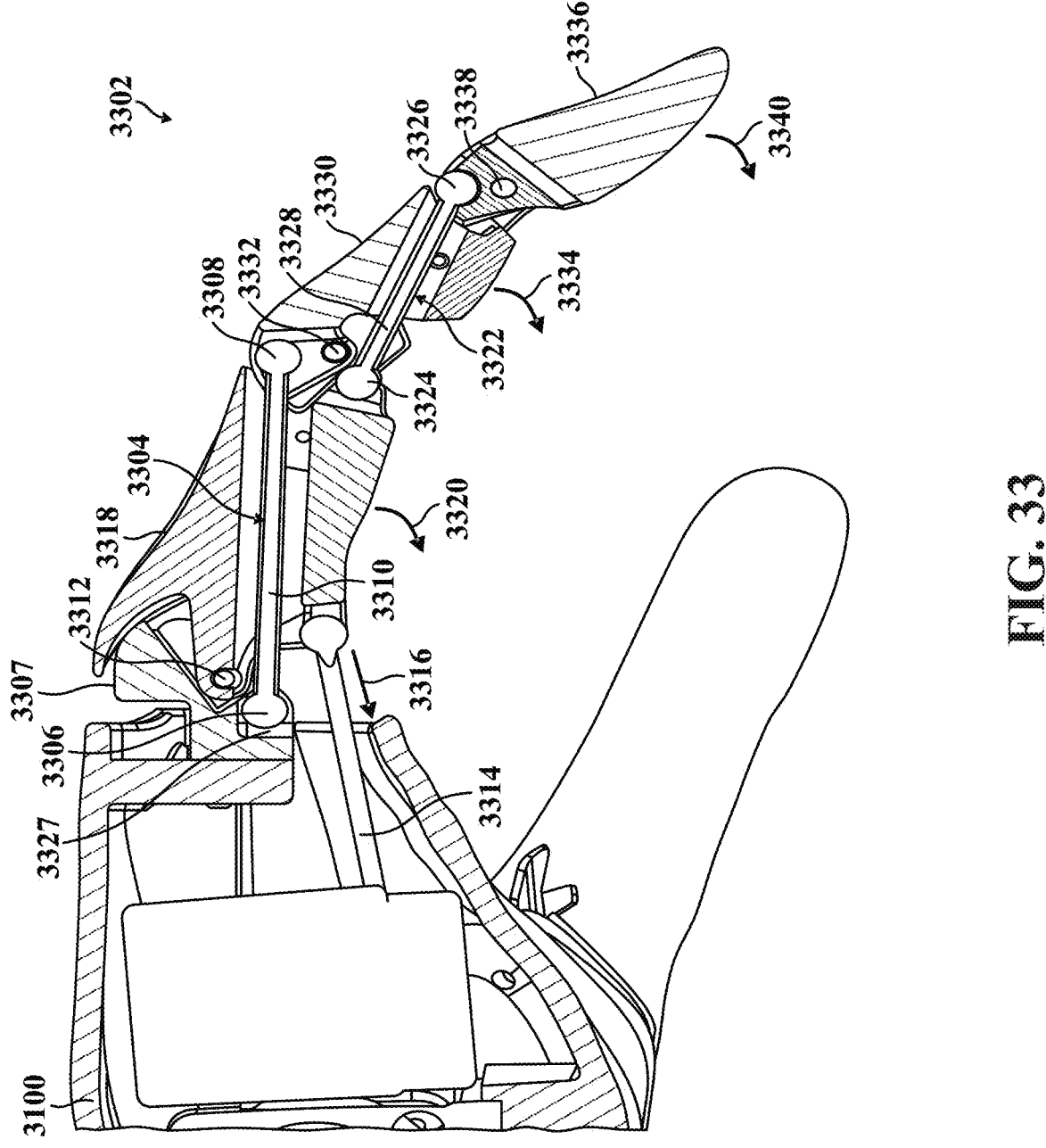
FIG. 33 illustrates a cross-sectional view of an articulated finger in accordance various aspects of the disclosure.

FIG. 33 illustrates a cross-sectional view of an articulated finger 3302 in accordance with various aspects of the disclosure. In some examples, the articulated finger 3302 may be implemented in the articulated hand 3100 (partially shown for ease of illustration). For example, the articulated finger 3302 may be implemented as an index finger of the articulated hand 3100, while the articulated finger 3102 may be implemented as a middle finger of the articulated hand

3100. This is shown in the side view of the articulated hand 3100 in FIG. 33 described herein.

The articulated finger 3302 may include a first rotatable joint member 3318, a second rotatable joint member 3330, and a third rotatable joint member 3336. A first ball-joint member 3304 may be situated in the first rotatable joint member 3318 and a second ball-joint member 3322 may be situated in the second rotatable joint member 3330. In some examples, the first ball-joint member 3304 may enable raising and lowering of the articulated finger 3302. For example, the first ball joint member 3304 may be lowered in a downward direction 3320 when a third ball-joint member 3314 is retracted in a direction 3316 to lower the first, second, and third rotatable joint members 3318, 3330, 3336 of the articulated finger 3302.

As shown in FIG. 33, the articulated hand 3100 may include a fixed joint member 3307 configured to moveably secure a first spherical ball 3306 of the first ball-joint member 3304. The first ball-joint member 3304 includes a rod 3310, the first spherical ball 3306, and a second spherical ball 3308. For example, the first spherical ball 3306 may be moveably secured in a socket cavity (e.g., socket cavity 3327 shown in FIG. 33) of the fixed joint member 3307 and the second spherical ball 3308 may be moveably secured in a socket cavity of the second rotatable joint member 3330, it should be noted that the second rotatable joint member 3330 and the second ball-joint member 3308 may form an articulated joint in accordance with the aspects described herein.

A downward movement of the first rotatable joint member 3318 (e.g., a rotation about a rod 3312 in the downward direction 3320) may also cause a downward movement of the second rotatable joint member 3330 and the first ball-joint member 3304. Since the first spherical ball 3306 of the first ball-joint member 3304 is moveably secured in the socket cavity of the fixed joint member 3307, the first ball-joint member 3304 may pull on the second rotatable joint member 3330 as the first rotatable joint member 3318 rotates about the rod 3312 in the downward direction 3320 and may cause the second rotatable joint member 3330 to rotate about a rod 3332 in a downward direction 3334.

In one example, the second rotatable joint member 3330 may rotate about the rod 3332 in the downward direction 3334 as the first rotatable joint member 3318 rotates about the rod 3312 in the downward direction 3320. In another example, the second rotatable joint member 3330 may rotate about the rod 3332 in an upward direction as the first rotatable joint member 3318 rotates about the rod 3312 in an upward direction. Therefore, in some examples, a rotation of the first rotatable joint member 3318 about the rod 3312 in the downward direction 3320 may cause the articulated finger 3302 to bend at the rod 3332.

The second ball-joint member 3322 includes a rod 3328, a first spherical ball 3324, and a second spherical ball 3326. For example, the first spherical ball 3324 may be moveably secured in a socket cavity of the first rotatable joint member 3318. The second spherical ball 3326 of the second ball-joint member 3322 may be moveably secured in a socket cavity of the third rotatable joint member 3336. It should be noted that the third rotatable joint member 3336 and the second ball-joint member 3322 may form an articulated joint in accordance with the aspects described herein.

Therefore, in the configuration of FIG. 33, the first ball-joint member 3304 may cause the second ball joint member 3322 of the articulated finger 3302 to rotate about the rod 3332 in the second direction 3334 as the first ball-joint member 3304 is lowered in the downward direction 3320. The second ball-joint member 3322 may cause the third rotatable joint member 3336 to rotate about a rod 3338 in a third direction 3340 as the second ball-joint member 3322 is lowered in the second direction 3334.

It should be noted that the configuration of first and second ball-joint members 3304, 3322 allows three degrees of freedom in the articulated finger 3302. Therefore, in some examples, the lowering of the articulated finger 3302 and the rotation of the second and third rotatable joint members 3330, 3336 may simulate a natural curling motion of a human finger.

The articulated joints described herein allow an articulated hand (e.g., the articulated hand 2500 in FIGS. 25-27) to have a range of motion comparable to the natural range of motion of a human hand, while maintaining a realistic size and/or scale of a human hand. For example, with reference to the articulated finger 2502 in FIG. 27, since shell components 2702, 2704 forming the articulated finger 2502 are rotatable ball-joint members of the articulated joints described herein, the shell components 2702, 2704 may be formed to replicate the shape, size, and/or scale of a human finger while enabling articulation. Similarly, remaining articulated fingers 2602, 2604, 2606, the thumb 2503, and/or a whole of the articulated hand 2500 may be formed in accordance with the proper shape, size, and/or scale of a human hand.

In some example implementations, a skin glove may be fitted on the articulated hand 2500. In such implementations, one or more fasteners (e.g., magnets, snaps, etc.) may be embedded in and/or attached to outer surfaces of the articulated hand 2500 so that the skin glove can be slipped on like a glove and secured into place. In some examples, the skin glove may comprise a silicone material having the appearance (e.g., color, texture, shape, etc.) of a human hand.

In some aspects, a stretchable material (SPANDEX) fabric layer, and/or padding may be placed between the skin glove and the outer surfaces of the articulated hand 2500 to further enhance the realistic appearance of the articulated hand 2500. In some aspects, padding may be used under the skin glove (e.g., woven into the stretchable material fabric layer) to protect the skin glove from the mechanics (e.g., the shell components 2702, 2704). Padding may be used over any gaps in the outer surfaces of the articulated hand 2500 to help maintain clean deformations and protect the material of the skin glove from movement of the articulated hand 2500 (e.g., movement of the shell components 2702, 2704). In some examples, the skin glove may be replaced with a costumed glove (e.g., a fashion glove) or other suitable type of glove. The articulated thumb 2503 may be removed or moved into a "maintenance" position so that the skin glove (or the costumed glove) can be taken on or off.

In some examples, the skin glove may have a thickness within a range of 1.27 mm to 5.08 mm. The thickness of the skin glove may be selected to accommodate one or more integrated fasteners (e.g., magnets, snaps, etc.) that enable coupling of the skin glove to corresponding fasteners on the articulated hand 2500. In some examples, a length of the skin glove may be shorter than a total length of the articulated hand 2500 to allow for stretching and a tight fit to simulate the appearance of human skin. In some examples, the thickness of the skin glove may be selected based on a size of the figure to which the articulated hand 2500 is to be attached and an amount of stretching needed.

In some aspects of the disclosure, some static portions of the articulated hand 2500 may be cast solid with wiring inside. In some examples, the length and/or thickness of the skin glove may be selected to fit the articulated hand 2500 while in a neutral pose, which may allow for even stretching of the skin glove, thereby reducing any folding or buckling.

Although the example implementations of the articulated joint described herein with reference to FIGS. 21-33 involve an articulated hand (e.g., the articulated hand 2500), it should be understood that the concepts described with respect to the articulated hand may be applied to other animated show elements, such as a tentacle of an animated octopus, a tail of an animated cat, and/or other limb or feature of an animated show element. For example, multiple articulated joints may be linked together to form a limb of a show element, which may provide several degrees of freedom of movement for the limb while achieving appropriate size and/or scale.

Figure 34:
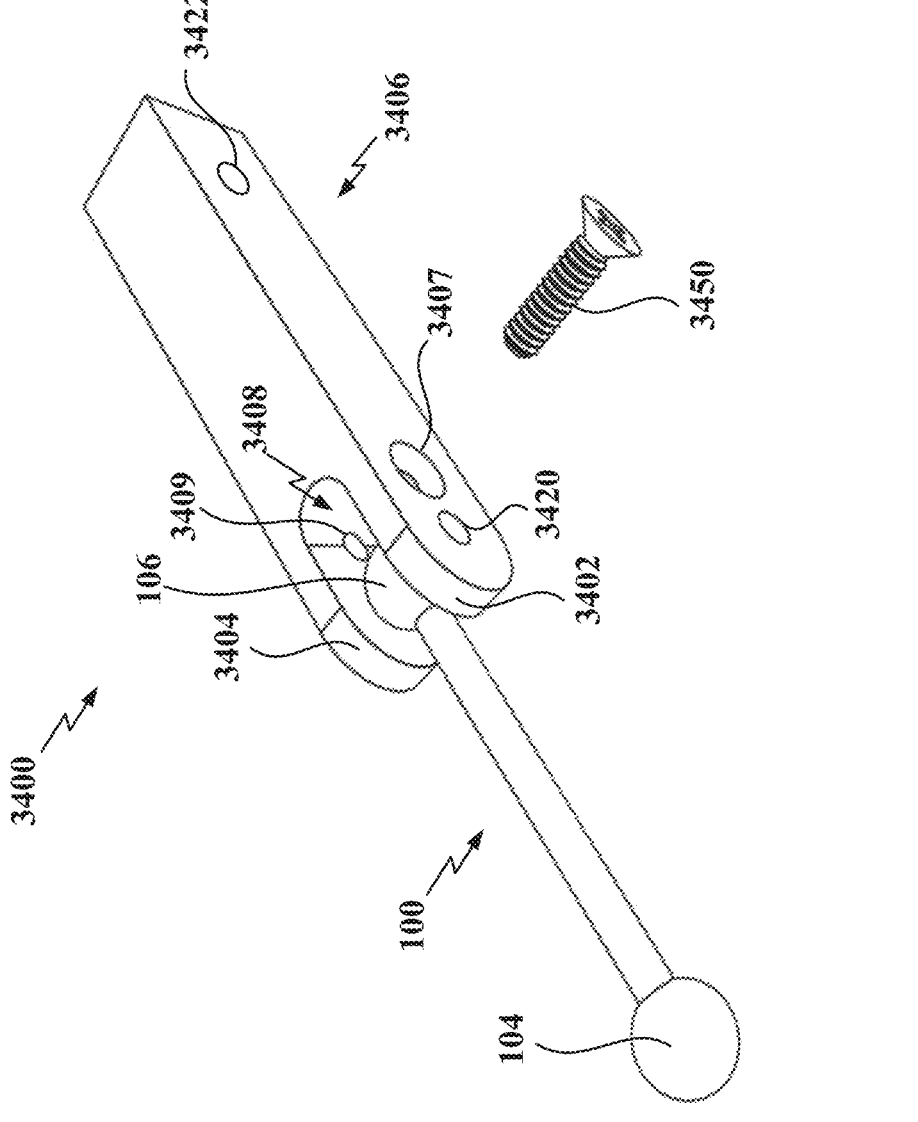
FIG. 34 is a diagram illustrating a perspective view of the rotatable joint member when the ball-joint member is moveably secured in the socket cavity.

FIG. 34 is a diagram illustrating a perspective view of a rotatable joint member 3400 when the ball-joint member 100 is moveably secured in a socket cavity 3408 in accordance with various aspects of the disclosure. The rotatable joint member 3400 includes a first socket joint element 3402, a second socket joint element 3404, and a base portion 3406. The first and second socket joint elements 3402, 3404 are coupled to the base portion 3406 and situated apart to provide the socket cavity 3408 between the first and second socket joint elements 3402, 3404.

In some aspects of the disclosure, the first and second socket joint elements 3402, 3404 may include socket retaining holes, such as the socket retaining hole 3420. In other aspects of the disclosure, the first and second socket joint elements 3402, 3404 may include concave regions in place of the retaining holes. In some aspects of the disclosure, the base portion 3406 of the rotatable joint member 3400 may include a hole 3422. In some examples, a rod may be placed through the hole 3422 to enable the rotatable joint member 3400 to freely rotate about the rod.

The first and second socket joint elements 3402, 3404 may further include openings 3407, 3409 for a fastener 3450. In some examples, the openings 3407, 3409 may be holes having the same diameter or different diameters. In one example, and as shown in FIG. 34, the fastener 3450 may be a screw. The fastener 3450 may be inserted through the openings 3407, 3409 after a spherical ball (e.g., the second spherical ball 106) of the ball-joint member 100 is moveably secured in the socket cavity 3408. This is shown in FIG. 35.

Figure 35:
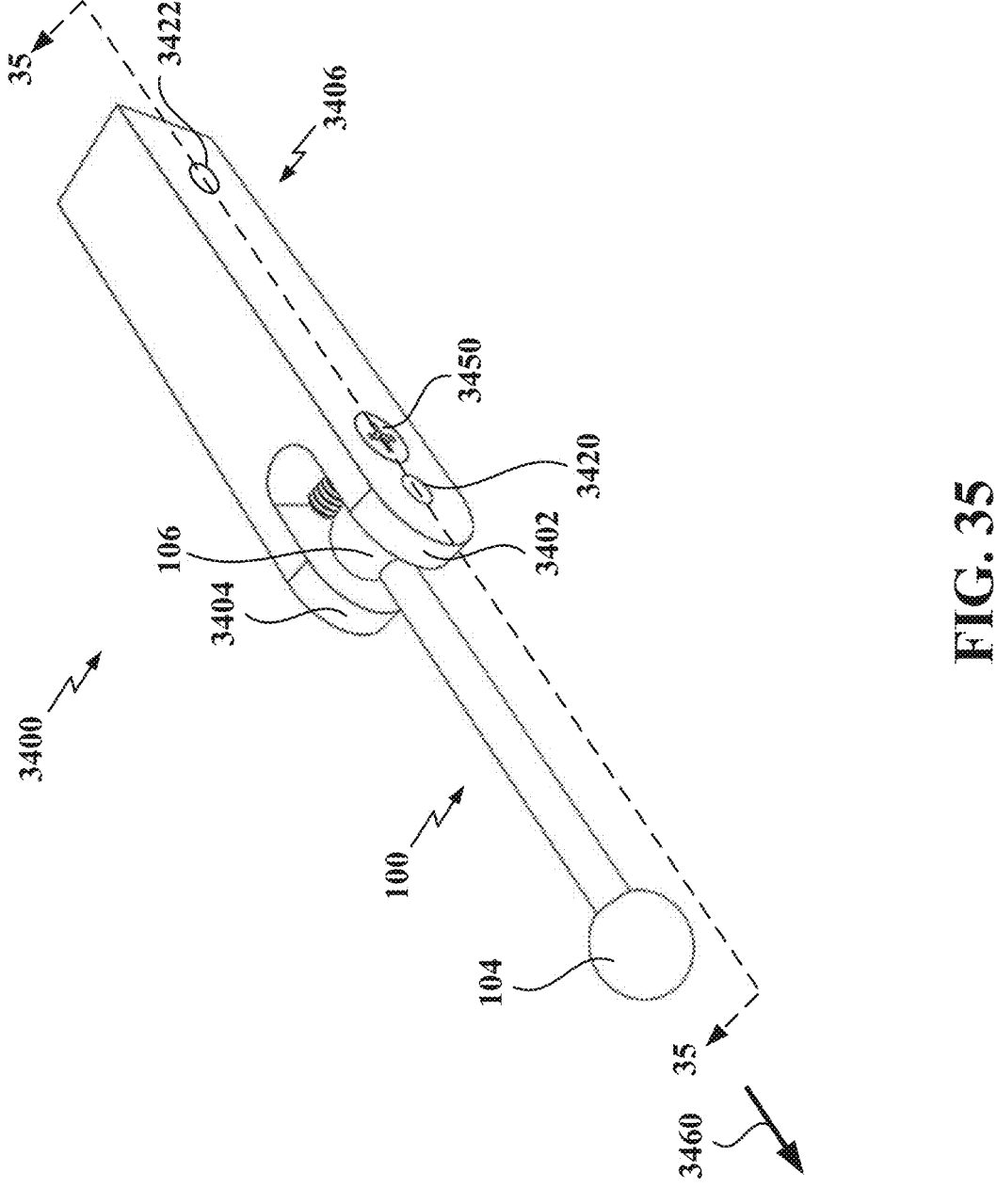
FIG. 35 is a diagram illustrating a perspective view of the rotatable joint member with the ball-joint member moveably secured in the socket cavity and the fastener inserted through the openings of the first and second socket joint elements in accordance with various aspects of the disclosure.

FIG. 35 is a diagram illustrating a perspective view of the rotatable joint member 3400 with the ball-joint member 100 moveably secured in the socket cavity 3408 and the fastener 3450 inserted through the openings 3407, 3409 of the first and second socket joint elements 3402, 3404 in accordance with various aspects of the disclosure. In some examples, the openings 3407, 3409 may be tapped holes to allow the fastener 3450 (e.g., a screw) to securely remain in the openings 3407, 3409.

The fastener 3450 may be inserted through the openings 3407, 3409 to prevent the first and second socket joint elements 3402, 3404 from spreading (e.g., during use of the rotatable joint member 3400) rather than to squeeze the first and second socket joint elements 3402, 3404 together. For example, the fastener 3450 may prevent the first and second socket joint elements 3402, 3404 from spreading and inadvertently releasing the ball-joint member 100 (e.g., in scenarios where the ball-joint member 100 is pulled in a direction 3460 with a significant force).

Figure 36:
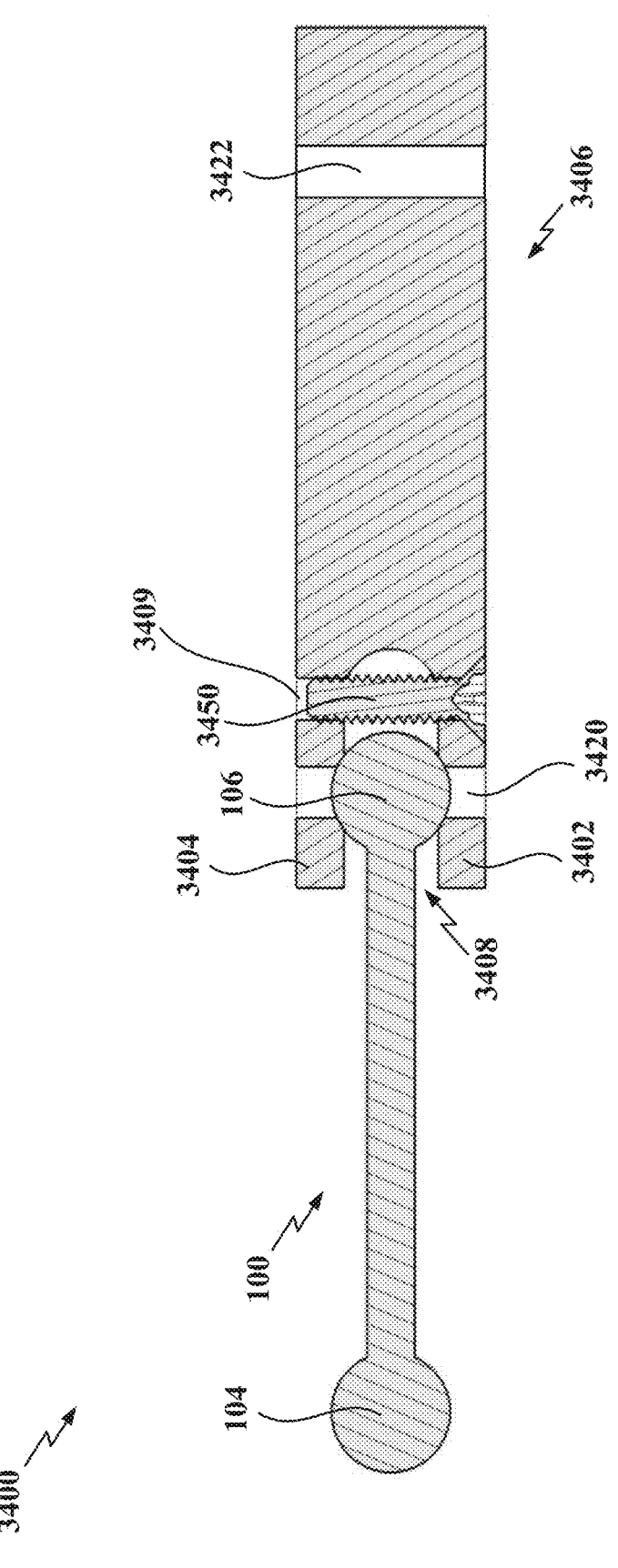
FIG. 36 is a diagram illustrating a cross-section of the rotatable joint member and the ball-joint member shown in FIG. 35 along the line 35-35.

FIG. 36 is a diagram illustrating a cross-section of the rotatable joint member 3400 and the ball-joint member 100 shown in FIG. 35 along the line 35-35. As shown in FIG. 36, the fastener 3450 may prevent the first and second socket joint elements 3402, 3404 from spreading to securely maintain the second spherical ball 106 of the ball-joint member 100 in the socket cavity 3408.

FIG. 37 is a flow chart illustrating an exemplary process 3700 for constructing an articulated joint in accordance with various aspects of the disclosure. In some examples, the process 3700 may be carried out by any suitable apparatus or means for carrying out the operations described below.

At block 3702, the process involves coupling a first rotatable joint member including a first socket cavity to a first axial member.

At block 3704, the process involves coupling a second rotatable joint member including a second socket cavity to a second axial member.

At block 3706, the process involves coupling the first rotatable joint member to the second rotatable joint member with an elongated member including a first end having a spherical shape and a second end having the spherical shape. The first end of the elongated member is moveably secured in the first socket cavity and the second end of the elongated member is moveably secured in the second socket cavity. In some examples, the elongated member is configured to rotate the second rotatable joint member in response to a rotation of the first rotatable joint member.

At block 3708, the process optionally involves coupling an actuator device to the first rotatable joint member.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-37 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-37 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An articulated joint, comprising:
   a first rotatable joint member including a first socket cavity situated between a first wall defining a first recessed region and a second wall defining a second recessed region, the first wall opposing the second wall such that the first recessed region is aligned with the second recessed region and spaced apart by a first distance, wherein the first rotatable joint member comprises a first axis offset from the first recessed region in a first direction transverse to the first distance;
   a second rotatable joint member including a second socket cavity situated between a third wall defining a third recessed region and a fourth wall defining a fourth recessed region, the third wall opposing the fourth wall such that the third recessed region is aligned with the fourth recessed region and spaced apart by a second distance, wherein the second rotatable joint member comprises a second axis offset from the third recessed region in a second direction transverse to the second distance; and
   an elongated member including a first end having a first spherical shape and a second end having a second spherical shape, wherein the first socket cavity is configured to forcibly receive the first spherical shape of the first end between the first recessed region and the second recessed region and the second socket cavity is configured to forcibly receive the second spherical shape of the second end between the third recessed region and the fourth recessed region,
   wherein the elongated member is configured to rotate the second rotatable joint member about the second axis in response to a rotation of the first rotatable joint member about the first axis.

2. The articulated joint of claim 1, wherein the first recessed region is formed by a first passage extending through the first wall of the first rotatable joint member and the second recessed region is formed by a second passage extending through the second wall of the first rotatable joint member.

3. The articulated joint of claim 1, wherein the third recessed region is formed by a third passage extending through the third wall of the second rotatable joint member and the fourth recessed region is formed by a fourth passage extending through the fourth wall of the second rotatable joint member.

4. The articulated joint of claim 1, further comprising:

an actuator device coupled to the first rotatable joint member, the actuator device configured to perform the rotation of the first rotatable joint member.

5. The articulated joint of claim 1, wherein the elongated member comprises a rod coupled to and extending between the first spherical shape of the first end and the second spherical shape the second end.

6. The articulated joint of claim 1, wherein at least one of the first end or the second end of the elongated member includes a hole, and wherein a retaining line is fed through the hole.

7. The articulated joint of claim 6, wherein the hole includes a conical opening.

8. The articulated joint of claim 1, further comprising a socket joint retainer fitted over the first rotatable joint member or the second rotatable joint member, wherein the socket joint retainer is configured to maintain the elongated member in the first rotatable joint member or the second rotatable joint member.

9. The articulated joint of claim 1, wherein the first rotatable joint member or the second rotatable joint member includes support wall, wherein the support wall increases a rigidity of the first wall and the second wall of the first rotatable joint member or the third wall and the fourth wall of the second rotatable joint member.

10. An articulated joint, comprising:

a rotatable joint member including a socket cavity situated between a first wall defining a first recessed region and a second wall defining a second recessed region, wherein the first wall opposes the second wall and is spaced apart from the second wall by a distance, and the rotatable joint member is configured to rotate about an axis; and an elongated member including at least one end having a spherical shape, wherein the socket cavity is configured to forcibly receive the at least one end between the first recessed region and the second recessed region, and wherein angular and/or linear movement of the elongated member is configured to rotate the rotatable joint member about the axis.

11. The articulated joint of claim 10, wherein the first recessed region is disposed in the first wall of the rotatable joint member and the second recessed region is disposed in the second wall of the rotatable joint member.

12. The articulated joint of claim 10, wherein the rotatable joint member includes a support wall, wherein the support wall increases a rigidity of the first wall and the second wall of the rotatable joint member.

13. The articulated joint of claim 10, wherein the elongated member is configured to rotate the rotatable joint member about the axis in response to an operation of an actuator device.

14. The articulated joint of claim 10, wherein the elongated member includes a first end having the spherical shape and a second end having the spherical shape, wherein the first end having the spherical shape is moveably secured in the socket cavity of the rotatable joint member and the second end having the spherical shape is moveably secured in an additional socket cavity of a fixed joint member.

15. The articulated joint of claim 14, wherein the elongated member is configured to rotate the rotatable joint member about the axis in response to a movement of the rotatable joint member.

16. The articulated joint of claim 10, wherein the articulated joint is included in an articulated finger of an articulated hand.

17. The articulated joint of claim 10, further comprising:

a socket joint retainer fitted over the rotatable joint member, wherein the socket joint retainer is configured to maintain the elongated member in the rotatable joint member.

\* \* \* \* \*